US012015797B2

(12) United States Patent
Gao et al.

(10) Patent No.: US 12,015,797 B2
(45) Date of Patent: *Jun. 18, 2024

(54) ENCODER, A DECODER AND CORRESPONDING METHODS USING IBC MERGE LIST

(71) Applicant: HUAWEI TECHNOLOGIES CO., LTD., Guangdong (CN)

(72) Inventors: Han Gao, Shenzhen (CN); Semih Esenlik, Munich (DE); Biao Wang, Shenzhen (CN); Anand Meher Kotra, Munich (DE); Jianle Chen, San Diego, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,903

(22) Filed: Dec. 14, 2022

(65) Prior Publication Data

US 2023/0130158 A1    Apr. 27, 2023

Related U.S. Application Data

(63) Continuation of application No. 16/993,597, filed on Aug. 14, 2020, now Pat. No. 11,546,626, which is a (Continued)

(51) Int. Cl.
*H04N 19/176* (2014.01)
*H04N 19/513* (2014.01)

(52) U.S. Cl.
CPC ........ *H04N 19/513* (2014.11); *H04N 19/176* (2014.11)

(58) Field of Classification Search
None
See application file for complete search history.

(56) References Cited

U.S. PATENT DOCUMENTS

2015/0264386 A1* 9/2015 Pang .............. H04N 19/463
                                                  375/240.16
2016/0105670 A1    4/2016 Pang et al.
(Continued)

FOREIGN PATENT DOCUMENTS

CN    107079161 A    8/2017
CN    107409220 A    11/2017
(Continued)

OTHER PUBLICATIONS

Benjamin Bross et al., "Versatile Video Coding(Draft 4)",Joint Video Experts Team (JVET) of ITU-T SG 16 WP 3 and ISO/IEC JTC 1/SC 29/WG 11,13th Meeting: Marrakech, MA, Jan. 9-18, 2019,JVET-M1001-V5, total:287pages.
(Continued)

*Primary Examiner* — Jessica M Prince
(74) *Attorney, Agent, or Firm* — WOMBLE BOND DICKINSON (US) LLP

(57) ABSTRACT

The present disclosure provides methods and devices of construct a candidate merge list for Intra block copy (IBC) mode, the method comprising: inserting a block vector of a left neighboring block of a current block into an initial merge list, when the left neighboring block is available and the left neighboring block is using IBC mode; inserting a block vector of an above neighboring block of the current block into the initial merge list, when the above neighboring block is available, the above neighboring block is using IBC mode and the block vector of the above neighboring block is not same as the block vector of the left neighboring block; inserting a block vector of the last candidate in a history based motion vector predictor (HMVP) into the initial merge list; obtaining a block vector of the current block according to the initial merge list.

8 Claims, 10 Drawing Sheets

Related U.S. Application Data continuation of application No. PCT/CN2020/074575, filed on Feb. 10, 2020.

(60) Provisional application No. 62/815,311, filed on Mar. 7, 2019, provisional application No. 62/813,690, filed on Mar. 4, 2019.

(56) References Cited

U.S. PATENT DOCUMENTS

| | | | |
|---|---|---|---|
| 2017/0289566 | A1 | 10/2017 | He et al. |
| 2020/0107017 | A1 | 4/2020 | Hung et al. |
| 2020/0112715 | A1 | 4/2020 | Hung et al. |
| 2020/0169745 | A1* | 5/2020 | Han ............ H04N 19/513 |
| 2020/0244979 | A1 | 7/2020 | Li et al. |
| 2020/0260113 | A1* | 8/2020 | Han ............ H04N 19/176 |
| 2021/0203922 | A1* | 7/2021 | Zhang ........... H04N 19/105 |

FOREIGN PATENT DOCUMENTS

| | | |
|---|---|---|
| CN | 108141605 A | 6/2018 |
| CN | 108683922 A | 10/2018 |
| EP | 3308544 A1 | 4/2018 |
| RU | 2632158 C2 | 10/2017 |
| WO | 2015180014 A1 | 12/2015 |
| WO | 2016200777 A1 | 12/2016 |

OTHER PUBLICATIONS

Han Gao et al.,"Non-CEB: IBC Mere List Simplification",Joint Video Experts Team (JVET) of ITU-T SG 16 WP 3 and ISO/IEC JTC 1/SC 29/WG 11,14th Meeting: Geneva, CH, Mar. 19-27, 2019,total:JVET-N0176,total:9pages.

ITU-T H.265(Feb. 2018), Series H: Audiovisual and Multimedia Systems, Infrastructure of audiovisual services—Coding of moving video, Feb. 2018. total 692 pages.

Li Zhang et al.,"CE4-related: Restrictions on History-based Motion Vector Prediction",Joint Video Experts Team (JVET) of ITU-T SG 16 WP 3 and ISO/IEC JTC 1/SC 29/WG 11,13th Meeting: Marrakech, MA, Jan. 9-18, 2019,JVET-M0272,total:4pages.

Wei-Jung Chien et al.,"CE4-related: Modification on History-based Mode Vector Prediction",Joint Video Exploration Team (JVET) of ITU-T SG 16 WP 3 and ISO/IEC JTC 1/SC 29/WG 11, 12th Meeting: Macao, CN, Oct. 3-12, 2018, JVET-L0401,total:5pages.

Yu Han et al.,"CE4: Modification on History-based Motion Vector Prediction", Joint Video Exploration Team (JVET) of ITU-T SG 16 WP 3 and ISO/IEC JTC 1/SC 29/WG 11,13th Meeting: Marrakech, MA, Jan. 9-18, 2019,JVET-M0126, total:9pages.

Zhang, CE-related: History-based Motion Vector Prediction, Jul. 10-18, 2018, Joint Video Experts Team (JVET) of Itu0T SG 16 WP 3 and ISO/IEC JTC 1/SC29/WG11 (Year: 2018).

Document: JVET-K0104-v1, Li Zhang et al, CE4-related: History-based Motion Vector Prediction, Joint Video Experts Team (JVET) of ITU-T SG 16 WP 3 and ISO/IEC JTC 1/SC 29/WG 11, 11th Meeting: Ljubljana, SI, Jul. 10-18, 2018, 5 pages.

Document: JVET-M0162-v1, Ching-Yeh Chen et al, Adaptive loop filter with a maximum number of luma filters per slice constraint, Joint Video Experts Team (JVET) of ITU-T SG 16 WP 3 and ISO/IEC JTC 1/SC 29/WG 11, 13th Meeting: Marrakech, MA, Jan. 9-18, 2019, 5 pages.

Document: JVET-O0455r2, Yao-Jen Chang et al, Non-CE8: On IBC merge mode, Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.

Li Zhang et al, CE4-related: Restrictions on History-based Motion Vector Prediction, Joint Video Experts Team (JVET) of ITU-T SG 16 WP 3 and ISO/IEC JTC 1/SC 29/WG 11, JVET-M0272, 13th Meeting: Marrakech, Jan. 9-18, 2019.

Benjamin Bross et al, Versatile Video Coding (Draft 4), Joint Video Experts Team (JVET) of ITU-T SG 16 WP 3 and ISO/IEC JTC 1/SC 29/WG 11, JVET-M1001-v5, 13th Meeting: Marrakech, Jan. 9-18, 2019.

* cited by examiner

ENCODER, A DECODER AND CORRESPONDING METHODS USING IBC MERGE LIST

CROSS-REFERENCE TO RELATED APPLICATIONS

This application is a continuation of U.S. patent application Ser. No. 16/993,597, filed on Aug. 14, 2020, which is a continuation of International Application No. PCT/CN2020/074575, filed on Feb. 10, 2020, which claims the priority to U.S. Provisional Patent Application No. 62/813,690, filed Mar. 4, 2019 and U.S. Provisional Patent Application No. 62/815,311, filed Mar. 7, 2019. All of the afore-mentioned patent applications are hereby incorporated by reference in their entireties.

TECHNICAL FIELD

Embodiments of the present application (disclosure) generally relate to the field of picture processing and more particularly to shared list for prediction.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding video contents.

The foregoing and other objects are achieved by the subject matter of the independent claims. Further implementation forms are apparent from the dependent claims, the description and the figures.

A first aspect of the invention discloses a method to construct a candidate merge list for Intra block copy (IBC) mode, the method comprising:
inserting a block vector of a left neighboring block of a current block into an initial merge list of the current block (in an example, the initial merge list is an empty list before this inserting operation), when the left neighboring block is available and the left neighboring block is using IBC mode;
inserting a block vector of an above neighboring block of the current block into the initial merge list (in an example, the initial merge list is an empty list before this operation, or the initial merge list comprises a block vector of a left neighboring block of a current block), when the above neighboring block is available, the above neighboring block is using IBC mode and the block vector of the above neighboring block is not same as the block vector of the left neighboring block;
inserting a block vector of the last candidate in a history based motion vector predictor, HMVP into the initial merge list, when the block vector of the above neighboring block is not same as the block vector of the last candidate in the HMVP and when the block vector of the left neighboring block is not same as the block vector of the last candidate in the HMVP.

A second aspect of the invention discloses a method to construct a candidate merge list for Intra block copy (IBC) mode, the method comprising:
inserting a block vector of a neighboring block of a current block into an initial merge list of the current block, when the neighboring block is available and the neighboring block is using IBC mode;
inserting a block vector of the last candidate in a history based motion vector predictor, HMVP into the initial merge list, when the block vector of the neighboring block is not same as the block vector of the last candidate in the HMVP;
inserting a block vector of another candidate in the HMVP into the initial merge list, wherein pruning for the block vector of another candidate in the HMVP is removed.

A third aspect of the invention discloses a method of construct a candidate merge list for Intra block copy (IBC) mode, the method comprising:
inserting a block vector of a left neighboring block of a current block into an initial merge list of the current block (in an example, the initial merge list is an empty list before this inserting operation), when the left neighboring block is available and the left neighboring block is using IBC mode;
inserting a block vector of an above neighboring block of the current block into the initial merge list (in an example, the initial merge list is an empty list before this operation, or the initial merge list comprises a block vector of a left neighboring block of a current block), when the above neighboring block is available, the above neighboring block is using IBC mode and the block vector of the above neighboring block is not same as the block vector of the left neighboring block;
inserting a block vector of the last candidate in a history based motion vector predictor, HMVP into the initial merge list, when the block vector of the above neighboring block is not same as the block vector of the last candidate in the HMVP and when the block vector of the left neighboring block is not same as the block vector of the last candidate in the HMVP; inserting a block vector of another candidate in the HMVP into the initial merge list, wherein pruning for the block vector of another candidate in the HMVP is removed.

A fourth aspect of the invention discloses a method of construct a candidate merge list for Intra block copy (IBC) mode, the method comprising:
inserting a block vector of a neighboring block of a current block into an initial merge list of the current block, when the neighboring block is available and the neighboring block is using IBC mode;
inserting a block vector of candidate in a history based motion vector predictor, HMVP into the initial merge list, when the block vector of the neighboring block is not same as the block vector of the last candidate in the HMVP; wherein the last block vector in the initial merge list of the current block is one block vector of one candidate in the HMVP.

A fifth aspect of the invention discloses a method of construct a candidate merge list for Intra block copy (IBC) mode, the method comprising:

inserting a block vector of a left neighboring block of a current block into an initial merge list of the current block (in an example, the initial merge list is an empty list before this inserting operation), when the left neighboring block is available and the left neighboring block is using IBC mode; inserting a block vector of an above neighboring block of the current block into the initial merge list (in an example, the initial merge list is an empty list before this operation, or the initial merge list comprises a block vector of a left neighboring block of a current block), when the above neighboring block is available, the above neighboring block is using IBC mode and the block vector of the above neighboring block is not same as the block vector of the left neighboring block;

inserting a block vector of last candidate in a history based motion vector predictor, HMVP into the initial merge list, when the block vector of the above neighboring block is not same as the block vector of the last candidate in the HMVP and when the block vector of the left neighboring block is not same as the block vector of the last candidate in the HMVP; inserting a block vector of another candidate in the HMVP into the initial merge list, wherein pruning for the block vector of another candidate in the HMVP is removed, and wherein the last block vector in the initial merge list of the current block is the block vector of the another candidate in the HMVP.

In one embodiment, for any one of the first aspect to the fifth aspect, the method further comprises: obtaining a block vector of the current block according to the initial merge list after the above inserting processes and a merge candidate index for the current block.

In one embodiment, for any one of the first aspect to the fifth aspect, wherein the initial merge list is an empty list before the first inserting process.

A sixth aspect of the invention discloses an encoder (20) comprising processing circuitry for carrying out any one of previous method embodiments.

A seventh aspect of the invention discloses a decoder (30) comprising processing circuitry for carrying out any one of previous method embodiments.

An eighth aspect of the invention discloses a computer program product comprising a program code for performing any one of previous method embodiments.

A ninth aspect of the invention discloses a decoder or an encoder, comprising: one or more processors; and a non-transitory computer-readable storage medium coupled to the processors and storing programming for execution by the processors, wherein the programming, when executed by the processors, configures the decoder to carry out any one of previous method embodiments.

Details of one or more embodiments are set forth in the accompanying drawings and the description below. Other features, objects, and advantages will be apparent from the description, drawings, and claims.

BRIEF DESCRIPTION OF THE DRAWINGS

The following embodiments of the invention are described in more detail with reference to the attached figures and drawings, in which.

DETAILED DESCRIPTION OF THE EMBODIMENTS

Figure 1A:
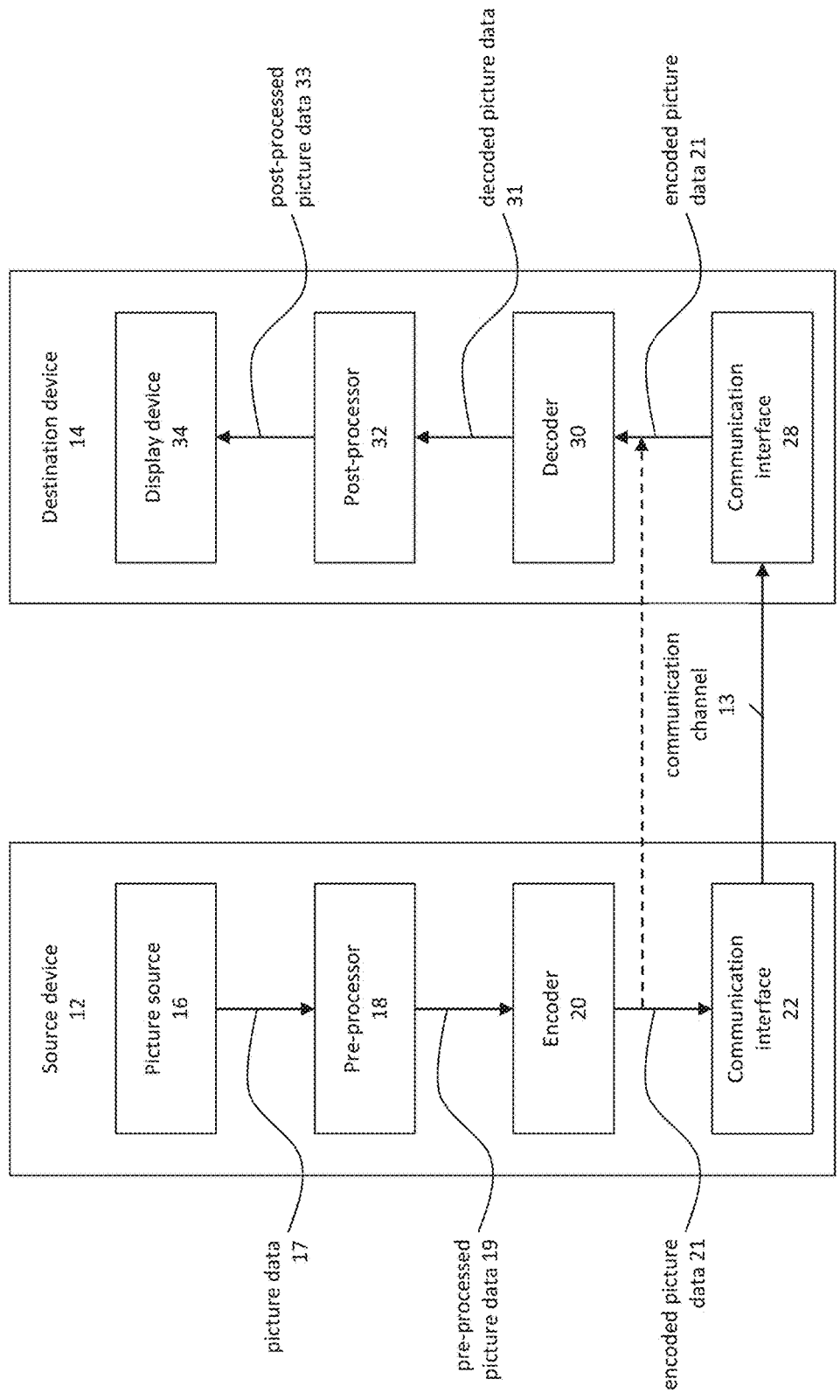
FIG. 1A is a block diagram showing an example of a video coding system configured to implement embodiments of the invention.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures.

Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or coding system 10) that may utilize techniques of this present application. Video encoder 20 (or encoder 20) and video decoder 30 (or decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured to receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
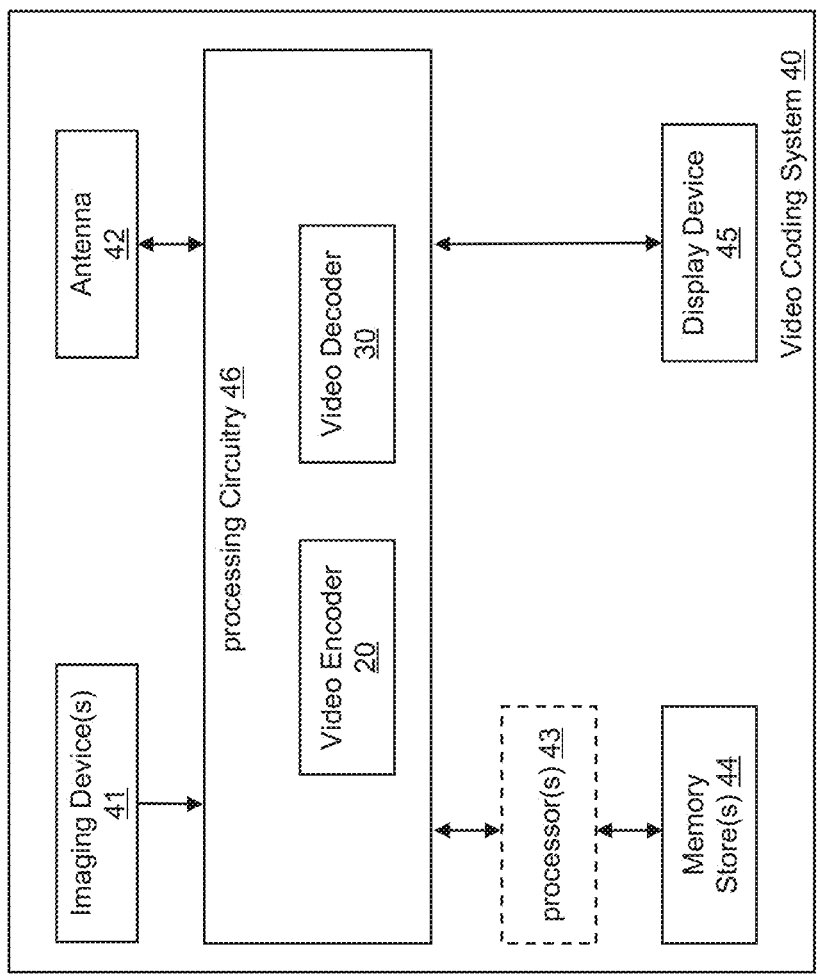
FIG. 1B is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
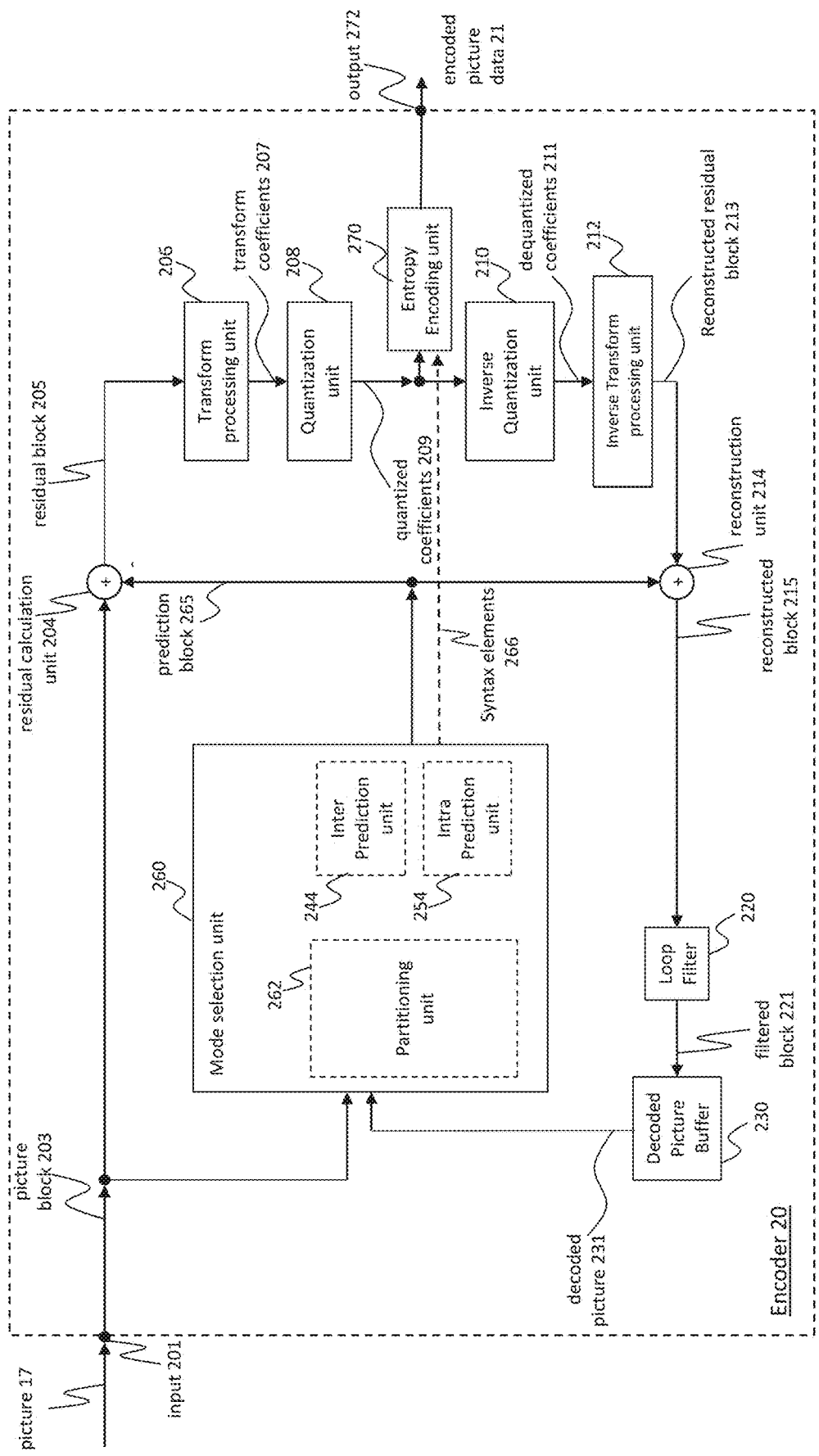
FIG. 2 is a block diagram showing an example of a video encoder configured to implement embodiments of the invention.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
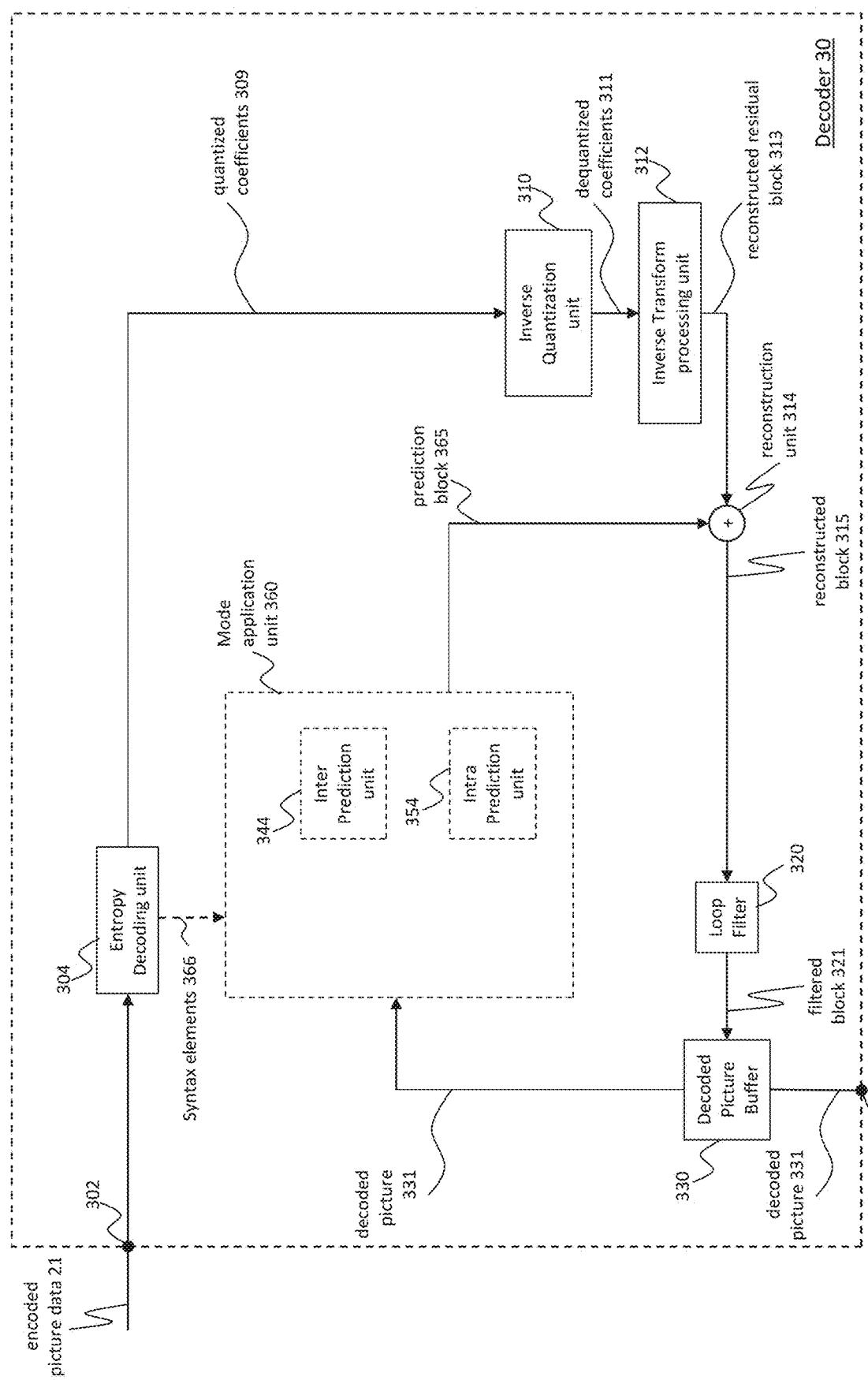
FIG. 3 is a block diagram showing an example structure of a video decoder configured to implement embodiments of the invention.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or luma) component Y represents the brightness or grey level intensity (e.g. like in a grey-scale picture), while the two chrominance (or chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, be an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is −32768~32767; if bitDepth is set equal to 18, the range is −131072~131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth. Method 1: remove the overflow MSB (most significant bit) by flowing operations $$ux=(mvx+2^{bitDepth})\%2^{bitDepth} \qquad (1)$$

$$mvx=(ux>=2^{bitDepth-1})?(ux-2^{bitDepth}):ux \qquad (2)$$

$$uy=(mvy+2^{bitDepth})\%2^{bitDepth} \qquad (3)$$

$$mvy=(uy>=2^{bitDepth-1})?(uy-2^{bitDepth}):uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\%2^{bitDepth} \qquad (5)$$

$$mvx=(ux>=2^{bitDepth-1})?(ux-2^{bitDepth}):ux \qquad (6)$$

$$uy=(mvpy+mvdy+2^{bitDepth})\%2^{bitDepth} \qquad (7)$$

$$mvy=(uy>=2^{bitDepth-1})?(uy-2^{bitDepth}):uy \qquad (8)$$

The operations may be applied during the sum of mvp and mvd, as shown in formula (5) to (8).

Method 2: remove the overflow MSB by clipping the value $$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x,y,z) = \begin{cases} x; & z < x \\ y; & z > y \\ z; & \text{otherwise} \end{cases}$$

Figure 4:
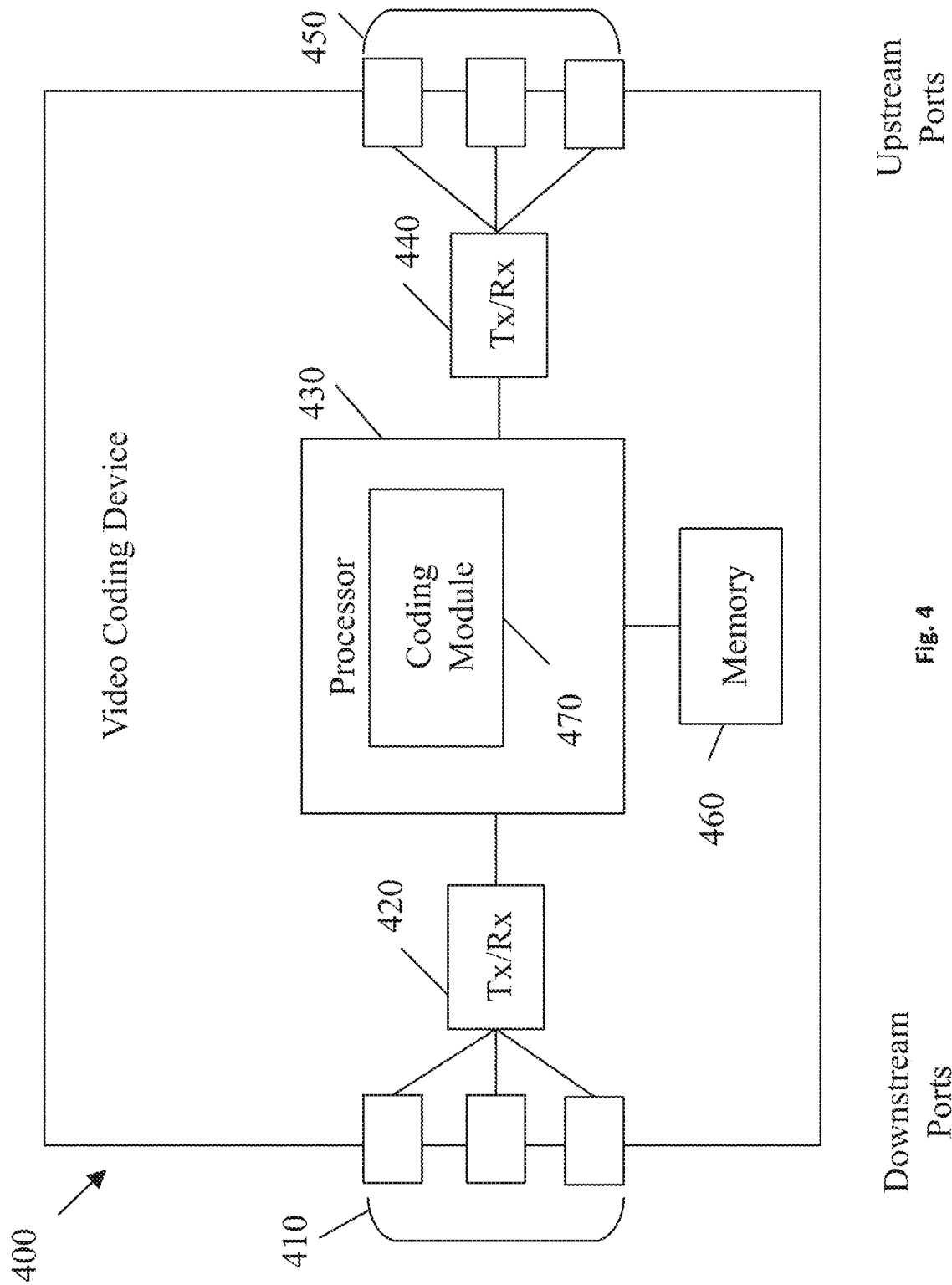
FIG. 4 is a block diagram illustrating an example of an encoding apparatus or a decoding apparatus according to one embodiment.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
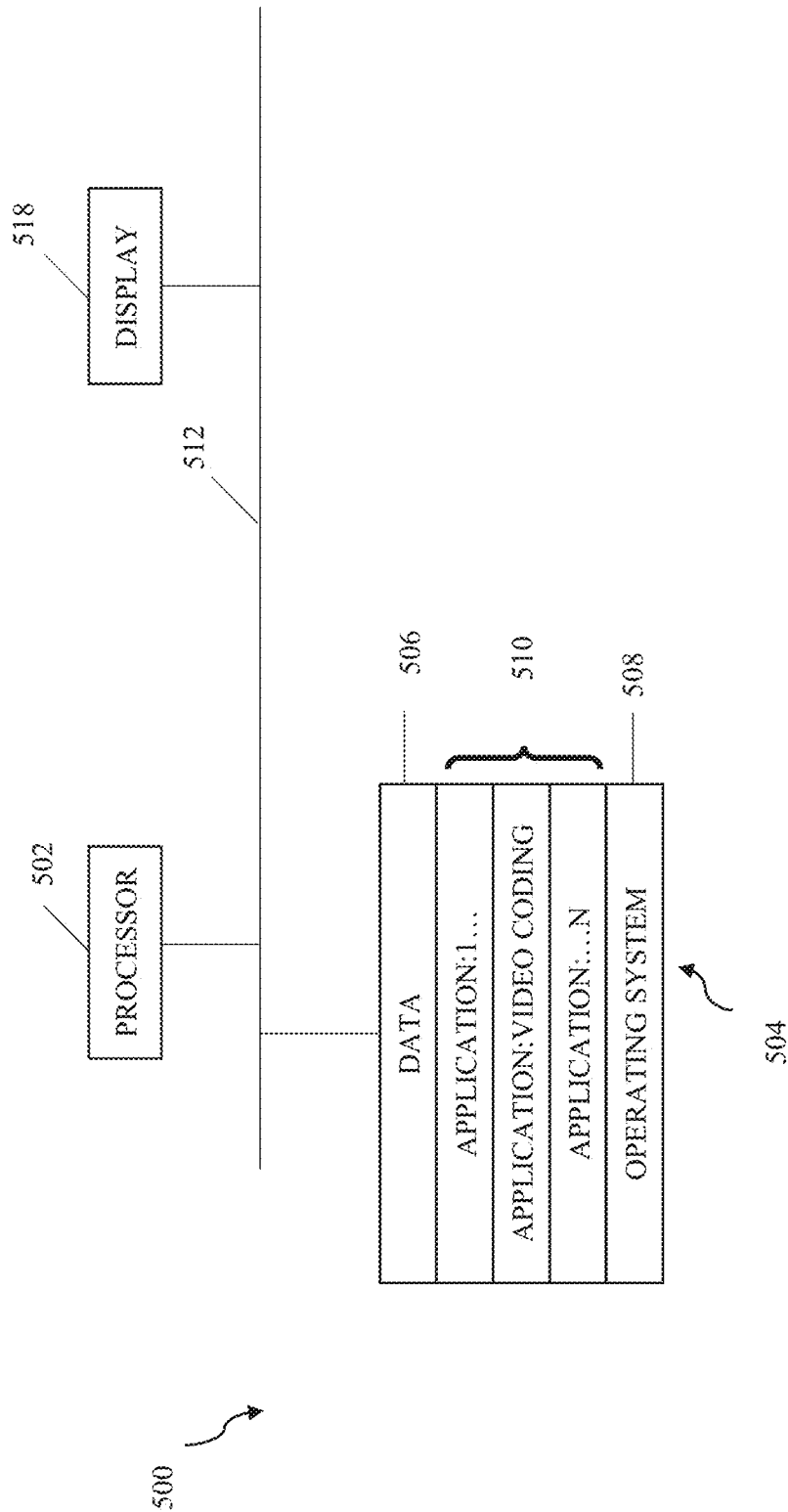
FIG. 5 is a block diagram illustrating another example of an encoding apparatus or a decoding apparatus according to one embodiment.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The inter prediction unit 244 may include motion estimation (ME) unit and motion compensation (MC) unit (not shown in FIG. 2). The motion estimation unit is configured to receive or obtain the picture block 203 (current picture block 203 of the current picture 201) and a decoded picture 331, or at least one or a plurality of previously reconstructed blocks, e.g. reconstructed blocks of one or a plurality of other/different previously decoded pictures 331, for motion estimation. E.g. a video sequence may comprise the current picture and the previously decoded pictures 331, or in other words, the current picture and the previously decoded pictures 331 may be part of or form a sequence of pictures forming a video sequence. The encoder 200 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV). Merging is an important motion estimation tool used in HEVC and is inherited by VVC to improve inter-picture coding efficiency. Merging saves bits for a motion vector (MV) by sharing the MV with neighboring blocks. Merge estimation is the process of finding merging candidates which achieves the highest compression efficiency.

To perform merge estimation, a merge candidate list is constructed, where each of the candidate in the candidate list includes motion data, these motion data including information that indicate whether one or two reference picture lists are used, and also including other information such as a reference index and a motion vector for each list. In an example, a merge candidate list is constructed based on at least the following candidates:

a. up to four spatial merge candidates that are derived from five spatial neighboring blocks;

b. one temporal merge candidate derived from two temporal, co-located blocks; and/or c. additional merge candidates including combined bi-predictive candidates and zero motion vector candidates.

The first candidates in the merge candidate list are the spatial neighbors. Up to four candidates are inserted in the merge list by sequentially checking A1, B1, B0, A0 and B2, in that order, referring to the right part of FIG. 6.

Besides checking whether a coding block is available and whether the coding block contains motion information, some additional redundancy checks are performed before using the motion data of the coding block for a merge candidate. These redundancy checks can be divided into two categories: a. avoid redundant motion data in the list; b. prevent merging two partitions that could be expressed by other means which would create redundant syntax.

In an example, N is the number of spatial merge candidates, a complete redundancy check can include $(N \cdot (N-1))/2$ motion data comparisons. In case of the five potential spatial merge candidates, ten motion data comparisons is needed to assure that all candidates in the merge list have different motion data. During the development of HEVC, the checks for redundant motion data have been reduced to a subset in a way that the coding efficiency is kept, while the comparison logic is significantly reduced. Lastly, no more than two comparisons are performed per candidate resulting in five overall comparisons. Given an ordered list of {A1, B1, B0, A0, B2}, B0 only checks B1, A0 only checks A1, and B2 only checks A1 and B1. In an example of the partitioning redundancy check, the bottom PU of a 2N×N partitioning is merged with the top one by choosing candidate B1. This would result in one CU with two PUs having the same motion data, which could be equally signaled as a 2N×2N CU. Overall, this check applies for all second PUs of the rectangular and asymmetric partitions 2N×N, 2N×nU, 2N×nD, N×2N, nR×2N and nL×2N. It is noted that for the spatial merge candidates, only the redundancy checks are performed and the motion data is copied from the candidate blocks. Hence, no motion vector scaling is needed here.

The derivation of the motion vectors for the temporal merge candidate is the same as for the Temporal Motion Vector Prediction (TMVP). Since a merge candidate comprises all motion data and the TMVP is only one motion vector (that means, in regular merge only maximal one TMVP candidate is allowed), the derivation of the motion data depends on the slice type. For bi-predictive slices, a TMVP is derived for each reference picture list. Depending on the availability of the TMVP for each list, the prediction type is set to bi-prediction or to the list for which the TMVP is available. All associated reference picture indices are set equal to zero. For uni-predictive slices, the TMVP for list 0 is derived together with the reference picture index equal to zero.

When at least one TMVP is available and the temporal merge candidate is added to the list, no redundancy check is performed. This makes the merge list construction independent of the co-located picture which improves error resilience. Consider the case where the temporal merge candidate would be redundant and therefore not included in the merge candidate list. In the event that a co-located picture is lost, the decoder cannot derive the temporal candidates and hence cannot check whether there is redundancy. The indexing of all subsequent candidates would thus be affected by the lost co-located picture.

For one embodiment, for parsing robustness, the number of candidates in the merge candidate list can be fixed. After the spatial and the temporal merge candidates have been added, the list may not be full (a number of candidates in the merge candidate list is smaller than the fixed number). In order to compensate for the loss in coding efficiency that comes along with the non-length adaptive list index signaling, additional candidates are generated. Depending on the slice type, up to two kind of candidates are used to fully populate the list: a. Combined bi-predictive candidates; b. Zero motion vector candidates.

In bi-predictive slices, additional candidates can be generated based on the existing candidates, by combining one candidate from reference picture list 0 motion data with another candidate from the list 1 motion data. This is done by copying $\Delta x0$, $\Delta y0$, $\Delta t0$ from one candidate, e.g. the first candidate, and copying $\Delta x1$, $\Delta y1$, $\Delta t1$ from another candidate, e.g. the second candidate. The different combinations according to some embodiments are shown in Table 1.

TABLE 1

| Combination Order | 0 | 1 | 2 | 3 | 4 | 5 | 6 | 7 | 8 | 9 | 10 | 11 |
|---|---|---|---|---|---|---|---|---|---|---|---|---|
| $\Delta x_0$, $\Delta y_0$, $\Delta t_0$ from Cand. | 0 | 1 | 0 | 2 | 1 | 2 | 0 | 3 | 1 | 3 | 2 | 3 |
| $\Delta x_1$, $\Delta y_1$, $\Delta t_1$ from Cand. | 1 | 0 | 2 | 0 | 2 | 1 | 3 | 0 | 3 | 1 | 3 | 2 |

If the list is not full after adding the combined bi-predictive candidates or for uni-predictive slices, zero motion vector candidates can be added according to some embodiments. Zero motion vector candidates have one zero displacement motion vector for uni-predictive slices and two zero displacement motion vectors for bi-predictive slices. The reference indices are set equal to zero, and are incremented by one for each additional candidate, until the maximum number of reference indices is reached. If additional candidates still need to be added, a reference index equal to zero is used to create additional candidates. For the additional candidates, no redundancy checks are performed as omitting these checks will not introduce a coding efficiency loss.

For each PU coded in inter-picture prediction mode, a merge_flag is used to indicate whether block merging is used to derive the motion data. A merge_idx is an index used to determine a candidate in the merge list that provides the motion data needed for the motion compensated prediction (MCP). Besides PU-level signaling, a number of candidates in the merge list can be signaled in the slice header. In an example, for a default value of five candidates, the index can be represented as a difference to five (five_minus_max_num_merge_cand). Regarding the merge candidate list construction process, the overall process remains the same although it terminates after the list contains the maximum number of merge candidates. In an embodiment, the maximum value for the merge index coding is given by a number of available spatial and temporal candidates in the list. When only two candidates are available, the index can be efficiently coded as a flag. In order to parse the merge index, the whole merge candidate list is constructed to determine the actual number of candidates.

An application of the block merging in HEVC is combined with a skip mode. The skip mode is used for a block to indicate that motion data for the block is inferred, instead of explicitly signaled in a bitstream and that the prediction residual for the block is zero, i.e. no transform coefficients are transmitted. In HEVC, at the beginning of each CU in an inter-picture prediction slice, a skip_flag is signaled for the following: a. the CU only contains one PU (2N×2N partition type); b. the merge mode is used to derive the motion data (merge_flag equal to 1); c. no residual data is present in the bitstream.

Another motion estimation tool introduced in HEVC and inherent in VVC is called Advanced Motion Vector Prediction (AMVP). In the AMVP mode, the motion vectors are coded in terms of horizontal (x) and vertical (y) components as a difference to a so called motion predictor (MVP). The calculation of motion vector difference (MVD) components is shown as MVDx=MVx−MVPx, MVDy=MVy−MVPy.

Motion vectors of a current block are usually correlated with the motion vectors of neighboring blocks in the current picture or in the earlier coded pictures. As neighboring blocks are likely to correspond to the same moving object with similar motion, and the motion of the object is not likely to change abruptly over time. Consequently, using the motion vectors in neighboring blocks as predictors reduces the size of the signaled motion vector difference. The MVPs are usually derived from decoded motion vectors from spatial neighboring blocks or from temporally neighboring blocks in the co-located picture. In HEVC, the approach of implicitly deriving the MVP was replaced by a technique known as motion vector competition, which explicitly signals which MVP from a list of MVPs, is used for motion vector derivation. The variable coding quadtree block structure in HEVC can result in one block having several neighboring blocks with motion vectors as potential MVP candidates. Taking the left neighbor as an example, in the case that a 64×64 luma prediction block could have 16 8×4 luma prediction blocks to the left, when a 64×64 luma coding tree block is not further split and the left one is split to the maximum depth. Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design.

The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position, and by removing redundant candidates to assure minimal signaling overhead. Exhaustive experiments throughout the standardization process investigated how the complexity of this motion vector prediction, and signaling scheme could be reduced without sacrificing too much coding efficiency. This led to significant simplifications of the AMVP design such as removing the median predictor, reducing the number of candidates in the list from five to two, fixing the candidate order in the list and reducing the number of redundancy checks. The design of the AMVP candidate list construction includes the following MVP candidates according to some embodiments:

up to two spatial candidate MVPs that are derived from five spatial neighboring blocks;

one temporal candidate MVPs derived from two temporal, co-located blocks when both spatial candidate MVPs are not available or they are identical; and/or zero motion vectors when the spatial, the temporal or both candidates are not available.

In the spatial candidate description, the derivation process flow for the two spatial candidates A and B is depicted in FIG. 13. For candidate A, motion data from the two blocks A0 and A1 at the bottom left corner is taken into account in a two pass approach. In the first pass, it is checked whether any of the candidate blocks contain a reference index that is equal to the reference index of the current block. The first motion vector found will be taken as candidate A. When all reference indices from A0 and A1 are pointing to a reference picture different than the reference index of the current block, the associated motion vector cannot be used as is. Therefore, in a second pass, the motion vectors is to be scaled according to the temporal distances between the candidate reference picture and the current reference picture. The temporal distance is expressed in terms of difference between the picture order count (POC) values, where POC values are used to define the display order of the pictures.

For candidate B, the candidates B0 to B2 are checked sequentially in the same way as A0 and A1. The second pass, however, is performed when blocks A0 and A1 do not contain any motion information, i.e. are not available or coded using intra-picture prediction. Then, candidate A is set equal to the non-scaled candidate B, if found, and candidate B is set equal to a second, non-scaled or scaled variant of candidate B. The second pass may end when there still might be potential non-scaled candidates, the second pass searches for non-scaled as well as for scaled MVs derived from candidates B0 to B2. Overall, this design allows A0 and A1 to be processed independently from B0, B1, and B2. The derivation of B should be aware of the availability of both A0 and A1, in order for a scaled or an additional non-scaled MV derived from B0 to B2 to be searched. This dependency significantly reduces the complex motion vector scaling operations for candidate B. Reducing the number of motion vector scalings represents a significant complexity reduction in the motion vector predictor derivation process.

Figure 6:
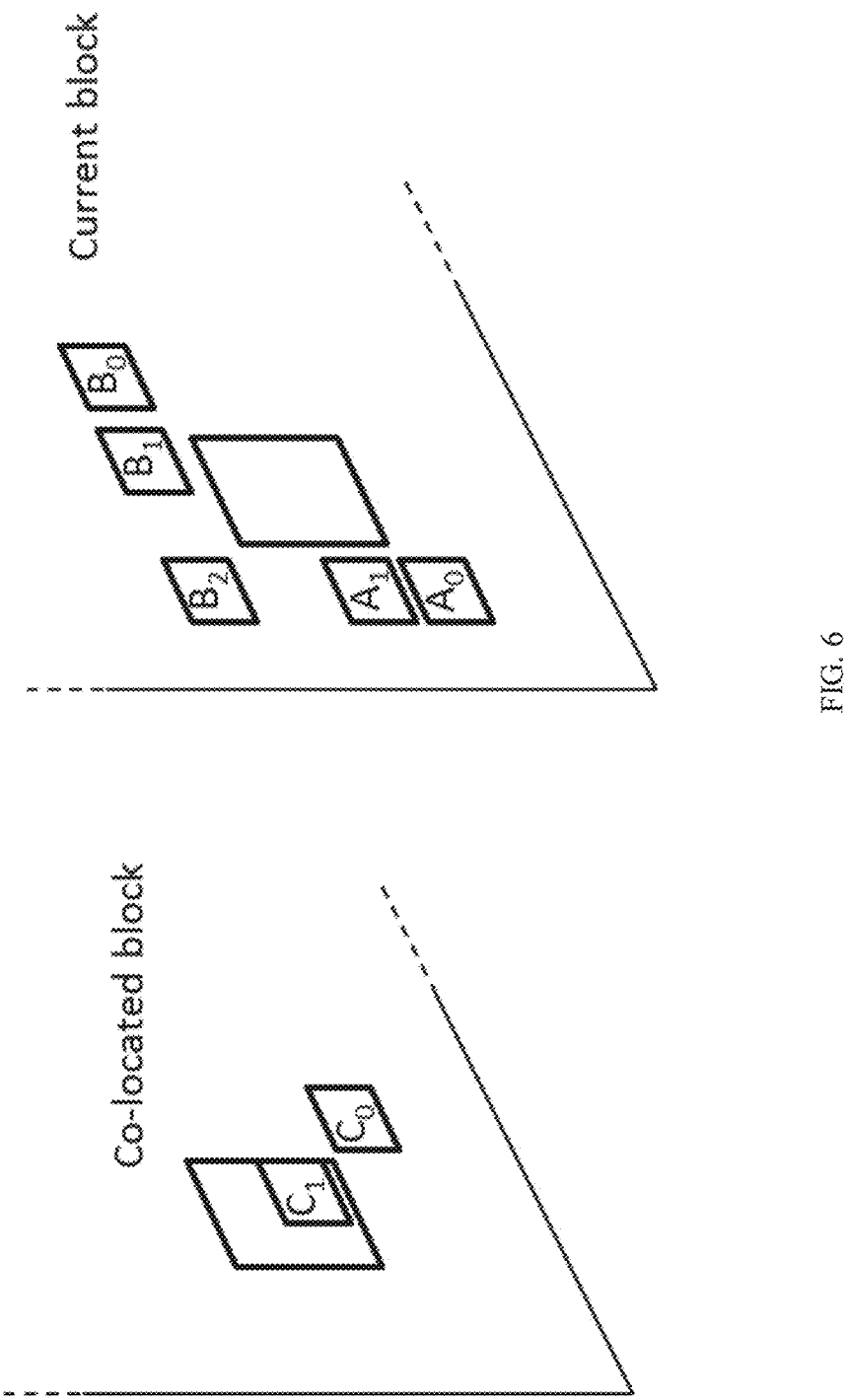
FIG. 6 is a block diagram illustrating an example of neighboring blocks of a current block according to one embodiment.
Figure 7:
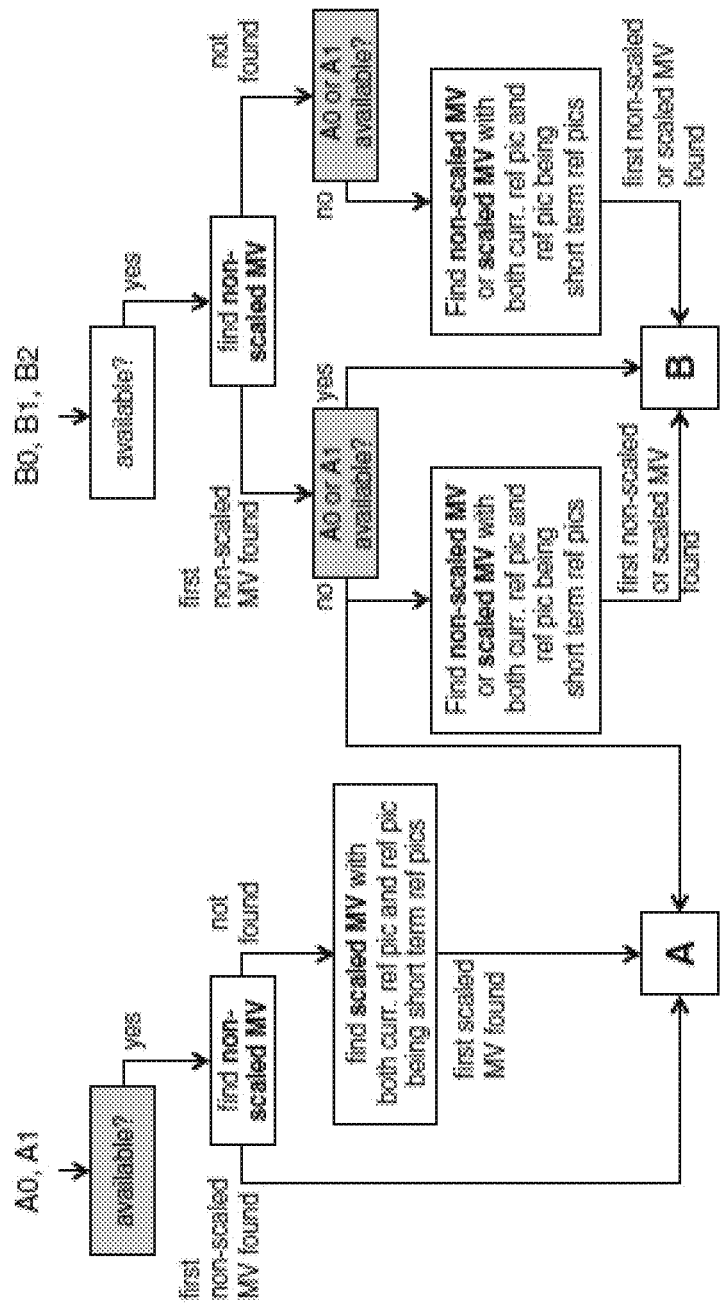
FIG. 7 shows an example according to an embodiment of the present application.

In the temporal candidate selection process. It can be seen from FIG. 6 that motion vectors from spatial neighboring blocks to the left and above the current block are considered as spatial MVP candidates. This can be explained as the blocks to the right and below the current block are not yet decoded and hence, their motion data is not available. Since the co-located picture is a reference picture which is already decoded, it is possible to also consider motion data from the block at the same position, from blocks to the right of the co-located block or from the blocks below. In HEVC, the block to the bottom right and at the center of the current block have been determined to be the most suitable to provide a good temporal motion vector predictor (TMVP). These candidates are illustrated in FIG. 6, where C0 represents the bottom right neighbor and C1 represents the center block. Motion data of C0 is considered first, if motion data of C0 is not available, motion data from the co-located candidate block at the center is used to derive the temporal MVP candidate C. The motion data of C0 is also considered as not being available when the associated PU belongs to a CTU beyond the current CTU row. This minimizes the memory bandwidth requirements to store the co-located motion data. In contrast to the spatial MVP candidates, where the motion vectors may refer to the same reference picture, motion vector scaling is mandatory for the TMVP.

Both for the Merge list construction and AMVP list construction, a history based motion vector predictor (HMVP) may be added to the merge or AMVP list according to some embodiments. The history-based MVP (HMVP) merge candidates can be added to merge/AMVP list after the spatial MVP and TMVP. In one embodiment, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM4, the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If there is an identical HMVP in the table, the identical HMVP is removed from the table and all the HMVP candidates afterwards are moved forward.

HMVP candidates could be used in the merge candidate list/AMVP list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

Number of HMPV candidates is used for merge list generation is set as (N<=4)?M: (8−N), wherein N indicates number of existing candidates in the merge list and M indicates number of available HMVP candidates in the table.

Once the total number of available merge candidates equal to the maximally allowed merge candidates minus 1, the merge candidate list construction process from HMVP is terminated.

In VVC Draft paralleling to Inter mode, IBC mode is introduced.

Intra block copy (IBC) is a tool adopted in HEVC extensions on SCC. It significantly improves the coding efficiency of screen content materials. Since IBC mode is implemented as a block level coding mode, block matching (BM) is performed at the encoder to find the optimal block vector (or motion vector) for each CU. Here, a motion vector is used to indicate the displacement from the current block to a reference block, which is already reconstructed inside the current picture. The luma motion vector of an IBC-coded CU is in integer precision. The chroma motion vector is clipped to integer precision as well. When combined with AMVR, the IBC mode can switch between 1-pel and 4-pel motion vector precisions. An IBC-coded CU is treated as the third prediction mode other than intra or inter prediction modes.

To reduce memory consumption and decoder complexity, the IBC in VTM4 allows the reconstructed portion of the predefined area including current CTU to be used. This restriction allows the IBC mode to be implemented using local on-chip memory for hardware implementations.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, a block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected. In block matching search, the search range is set to be N samples to the left and on top of the current block within the current CTU. At the beginning of a CTU, the value of N is initialized to 128 if there is no temporal reference picture, or initialized to 64 if there is at least one temporal reference picture. A hash hit ratio is defined as the percentage of samples in the CTU that found a match using hash-based search. While encoding the current CTU, if the hash hit ratio is below 5%, N is reduced by half.

At CU level, IBC mode is signaled with a flag and it can be signaled as IBC AMVP mode or IBC skip/merge mode as follows:

IBC skip/merge mode: a merge candidate index is used to indicate which block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

Since IBC introduced the IBC merge/skip mode and IBC AMVP mode, there is additional IBC merge list and AMVP list to be constructed in the VVC Draft 4.0.

Since only spatial candidates (left neighboring block A1, above neighboring block B1, left bottom neighboring block A0, right above neighboring block B0 and left above neighboring block B2 as shown in FIG. 6), HMVP candidates ($H_1 \ldots H_k$, k is equal to maximum HMVP list size) and pairwise candidates are used to construct the IBC merge list in order in the VVC Draft 4.0. The following pruning is possible performed during IBC merge list construction:

Pruning between A1 and B1
Pruning between A0 and A1
Pruning between B0 and B1
Pruning between B2 and A1
Pruning between B2 and B1
Pruning between the last HMVP candidate $H_k$ and A1
Pruning between the last HMVP candidate $H_k$ and B1
Pruning between the second last HMVP candidate $H_{k-1}$ and A1
Pruning between the second last HMVP candidate $H_{k-1}$ and B1

The pruning processing means compare whether two IBC merge candidate is same. More specifically, the pruning processing compares whether the block vectors between two IBC merge candidate is same.

In summary, the maximum number of 9 pruning are necessary to construct the IBC merge list of the current block.

In the encoder and decoder, pruning can delay the merge list construction process. Because in each pruning stage, an "if" condition is checked, and further merge list construction process is performed depends on this "if" condition checks. The more pruning in the merge candidate list construction, the more complexity is involved in the encoder and decoder processes. In order to reduce the merge list construction complexity, the following solutions are introduced.

Solution 1

Since, the left (A1) and above (B1) spatial neighboring blocks are important for predicting the current block by using IBC mode. In solution 1, the spatial neighboring block pruning between A1 and B1 is kept, the rest of the spatial neighboring block pruning is removed. The HMVP candidate pruning is kept. In an embodiment, the following pruning may be performed during IBC merge list construction:

Pruning between A1 and B1
Pruning between the last HMVP candidate $H_k$ and A1
Pruning between the last HMVP candidate $H_k$ and B1
Pruning between the second last HMVP candidate $H_{k-1}$ and A1
Pruning between the second last HMVP candidate $H_{k-1}$ and B1.

In this case, the maximum number of pruning to construct an IBC merge candidate list for a current block is reduced from 9 to 5. This solution significant reduced the IBC merge list construction complexity for both encoder and decoder.

In an example, the concrete IBC merge candidate list is constructed as follow:

If the A1 neighboring block is available and is using IBC mode, the block vector of A1 block is inserted into the IBC merge candidate list of the current block. Otherwise (A1 is not available or A1 is not using IBC mode), the block vector of A1 block is not inserted into the IBC merge candidate list of the current block (first candidate, no pruning).

If the B1 neighboring block is available and is using IBC mode, prune (or determine) whether the block vector of B1 is same as A1. If the block vector of B1 is not same as the block vector of A1, the block vector of B1 block is inserted into the IBC merge candidate list of the current block. Otherwise (block vector of B1 is same as the block vector A1, or B1 is not available or B1 is not using IBC mode), the block vector of B1 block is not inserted into the IBC merge candidate list of the current block (A1 and B1 pruning).

If the B0 neighboring block is available and is using IBC mode, the block vector of B0 block is inserted into the IBC merge candidate list of the current block. Otherwise (B0 is not available or B0 is not using IBC mode), the block vector of B0 block is not inserted into the IBC merge candidate list of the current block (no pruning).

If the A0 neighboring block is available and is using IBC mode, the block vector of A0 block is inserted into the IBC merge candidate list of the current block. Otherwise (A0 is not available or A0 is not using IBC mode), the block vector of A0 block is not inserted into the IBC merge candidate list of the current block (no pruning).

If the B2 neighboring block is available and is using IBC mode, and current IBC merge candidate list size is smaller than 4, the block vector of B2 block is inserted into the IBC merge candidate list of the current block. Otherwise (B2 is not available or B2 is not using IBC mode or current IBC merge candidate list size is not smaller than 4), the block vector of B2 block is not inserted into the IBC merge candidate list of the current block (no pruning).

If the last HMVP candidate $H_k$ is available and is using IBC mode, and the current IBC merge candidate list size is smaller than a value, the value equal to the maximum IBC merge candidate number minus one; and the block vector of $H_k$ is not same as A1 and B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of A1, or the block vector of $H_k$ is same as the block vector of B1) not insert the block vector of $H_k$ into the IBC merge candidate list of the current block (pruning $H_k$ and A1, $H_k$ and B1).

If the second last HMVP candidate $H_{k-1}$ is available and is using IBC mode, and the current IBC merge candidate list size is smaller than a value, the value equal to the maximum IBC merge candidate number minus one, and the block vector of $H_{k-1}$ is not same as A1 and B1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one, or the block vector of $H_{k-1}$ is same as the block vector of A1, or the block vector of $H_{k-1}$ is same as the block vector of B1) not insert the block vector of $H_{k-1}$ block into the IBC merge candidate list of the current block (pruning $H_{k-1}$ and A1, $H_{k-1}$ and B1).

Insert the rest of the HMVP candidates one by one into the IBC merge candidate list, if the candidate is available and is using IBC mode, and the current IBC merge candidate list size is smaller than the maximum IBC merge candidate number minus one (no pruning).

Insert the pairwise candidate into the IBC merge candidate list, if the current IBC merge candidate list size is smaller than maximum IBC merge candidate number (no pruning).

Solution 2

Since, the left (A1) and above (B1) spatial neighboring blocks are important for predicting the current block by using IBC mode. In solution 2, the spatial neighboring block A1 and B1 is inserted into the IBC merge candidate, the rest spatial neighboring block candidates are removed. The HMVP candidate pruning is kept as it. In an embodiment, the following pruning may be performed during IBC merge list construction:

Pruning between A1 and B1
Pruning between the last HMVP candidate $H_k$ and A1
Pruning between the last HMVP candidate $H_k$ and B1
Pruning between the second last HMVP candidate $H_{k-1}$ and A1
Pruning between the second last HMVP candidate $H_{k-1}$ and B1

In this case, the maximum number of pruning to construct an IBC merge candidate list of current block is reduced from 9 to 5. The solution significant reduced the IBC merge list construction complexity for both encoder and decoder.

In an example, the concrete IBC merge candidate list is constructed as follow:

If the A1 neighboring block is available and is using IBC mode, insert the block vector of A1 block into the IBC merge candidate list of the current block. Otherwise (A1 is not available or A1 is not using IBC mode), not insert the block vector of A1 block into the IBC merge candidate list of the current block (first candidate, no pruning).

If the B1 neighboring block is available and is using IBC mode, prune (or determine) whether the block vector of B1 is same as A1. If the block vector of B1 is not same as the block vector of A1, insert the block vector of B1 block into the IBC merge candidate list of the current block. Otherwise (block vector of B1 is same as the block vector A1, or B1 is not available or B1 is not using IBC mode), not insert the block vector of A1 block into the IBC merge candidate list of the current block (A1 and B1 pruning).

If the last HMVP candidate $H_k$ is available and is using IBC mode, and the current IBC merge candidate list size is smaller than a value, the value equal to the maximum IBC merge candidate number minus one, and the block vector of $H_k$ is not same as A1 and B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of A1, or the block vector of $H_k$ is same as the block vector of B1), not insert the block vector of $H_k$ into the IBC merge candidate list of the current block (pruning $H_k$ and A1, $H_k$ and B1).

If the second last HMVP candidate $H_{k-1}$ is available and is using IBC mode, and the current IBC merge candidate list size is smaller than a value, the value equal to the maximum IBC merge candidate number minus one, and the block vector of $H_{k-1}$ is not same as A1 and B1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one, or the block vector of $H_{k-1}$ is same as the block vector of A1, or the block vector of $H_{k-1}$ is same as the block vector of B1) not insert the block vector of $H_{k-1}$ into the IBC merge candidate list of the current block (pruning $H_{k-1}$ and A1, $H_{k-1}$ and B1).

Insert the rest of the HMVP candidates one by one into the IBC merge candidate list, if the candidate is available and is using IBC mode, and the current IBC merge candidate list size is smaller than the maximum IBC merge candidate number minus one. (no pruning)

Insert the pairwise candidate into the IBC merge candidate list, if the current IBC merge candidate list size is smaller than maximum IBC merge candidate number. (no pruning)

Solution 3

According to solution 3, the block vector pruning of spatial neighboring block is kept the same (e.g., inserted). For the HMVP candidate pruning, the block vector of the last HMVP candidate $H_k$ is pruned with the block vector spatial neighboring block A1 and B1. The rest of the HMVP candidate are removed. In an embodiment, the following pruning is possible performed during IBC merge list construction:

Pruning between A1 and B1
Pruning between A0 and A1
Pruning between B0 and B1
Pruning between B2 and A1
Pruning between B2 and B1
Pruning between the last HMVP candidate $H_k$ and A1
Pruning between the last HMVP candidate $H_k$ and B1.

In this case, the maximum number of pruning to construct an IBC merge candidate list of current block is reduced from 9 to 7. The solution significant reduced the IBC merge list construction complexity for both encoder and decoder.

In an example, the concrete IBC merge candidate list is constructed as follow:

If the A1 neighboring block is available and is using IBC mode, insert the block vector of A1 block into the IBC merge candidate list of the current block. Otherwise (A1 is not available or A1 is not using IBC mode), not insert the block vector of A1 block into the IBC merge candidate list of the current block (first candidate, no pruning).

If the B1 neighboring block is available and is using IBC mode, prune (or determine) whether the block vector of B1 is same as A1. If the block vector of B1 is not same as the block vector of A1, insert the block vector of B1 block into the IBC merge candidate list of the current block. Otherwise (block vector of B1 is same as the block vector A1, or B1 is not available or B1 is not using IBC mode), not insert the block vector of A1 block into the IBC merge candidate list of the current block (A1 and B1 pruning).

If the B0 neighboring block is available and is using IBC mode, prune (or determine) whether the block vector of B0 is same as B1. If the block vector of B0 is not same as the block vector of B1, insert the block vector of B0 block into the IBC merge candidate list of the current block. Otherwise (block vector of B0 is same as the block vector B1, or B0 is not available or B0 is not using IBC mode), not insert the block vector of B0 block into the IBC merge candidate list of the current block (B0 and B1 pruning).

If the A0 neighboring block is available and is using IBC mode, prune (or determine) whether the block vector of A0 is same as A1. If the block vector of A0 is not same as the block vector of A1, insert the block vector of A0 block into the IBC merge candidate list of the current block. Otherwise (block vector of A0 is same as the block vector A1, or A0 is not available or A0 is not using IBC mode), not insert the block vector of A0 block into the IBC merge candidate list of the current block (A0 and A1 pruning).

If the B2 neighboring block is available and is using IBC mode, and the current IBC merge list size is smaller than 4, prune (or determine) whether the block vector of B2 is same as A1 and whether the block vector of B2 is same as B1. If the block vector of B2 is not same as the block vector of A1, and the block vector of B2 is not same as B1, insert the block vector of B2 block into the IBC merge candidate list of the current block. Otherwise (block vector of B2 is same as the block vector A1 or B1, or B0 is not available or B0 is not using IBC mode), not insert the block vector of B0 block into the IBC merge candidate list of the current block (B2 and A1 pruning and B2 B1 pruning).

If the last HMVP candidate $H_k$ is available and is using IBC mode, and the current IBC merge candidate list size is smaller than a value, the value equal to the maximum IBC merge candidate number minus one, and the block vector of $H_k$ is not same as A1 and B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of A1, or the block vector of $H_k$ is same as the block vector of B1) not insert the block vector of $H_k$ into the IBC merge candidate list of the current block (pruning $H_k$ and A1, $H_k$ and B1).

Insert the rest of the HMVP candidates one by one into the IBC merge candidate list, if the candidate is available and is using IBC mode and the current IBC merge candidate list size is smaller than a value, the value equal to the maximum IBC merge candidate number minus one (no pruning).

Insert the pairwise candidate into the IBC merge candidate list, if the current IBC merge candidate list size is smaller than maximum IBC merge candidate number (no pruning).

Solution 4

According to solution 4, the block vector pruning of spatial neighboring block is kept the same. For the HMVP candidate pruning, the block vector of the last HMVP candidate $H_k$ and the second last HMVP candidate $H_{k-1}$ is pruned with the block vector spatial neighboring block A1. The rest of the HMVP candidates are removed. In an embodiment, the following pruning is possible performed during IBC merge list construction:

Pruning between A1 and B1
Pruning between A0 and A1
Pruning between B0 and B1
Pruning between B2 and A1
Pruning between B2 and B1
Pruning between the last HMVP candidate $H_k$ and A1
Pruning between the second last HMVP candidate $H_{k-1}$ and A1.

In this case, the maximum number of pruning to construct an IBC merge candidate list of current block is reduced from 9 to 7. The solution significant reduced the IBC merge list construction complexity for both encoder and decoder.

In an example, the concrete IBC merge candidate list is constructed as follow:

If the A1 neighboring block is available and is using IBC mode, insert the block vector of A1 block into the IBC merge candidate list of the current block. Otherwise (A1 is not available or A1 is not using IBC mode), not insert the block vector of A1 block into the IBC merge candidate list of the current block (first candidate, no pruning).

If the B1 neighboring block is available and is using IBC mode, prune (or determine) whether the block vector of B1 is same as A1. If the block vector of B1 is not same as the block vector of A1, insert the block vector of B1 block into the IBC merge candidate list of the current block. Otherwise (block vector of B1 is same as the block vector A1, or B1 is not available or B1 is not using IBC mode), not insert the block vector of A1 block into the IBC merge candidate list of the current block (A1 and B1 pruning).

If the B0 neighboring block is available and is using IBC mode, prune (or determine) whether the block vector of B0 is same as B1. If the block vector of B0 is not same as the block vector of B1, insert the block vector of B0 block into the IBC merge candidate list of the current block. Otherwise (block vector of B0 is same as the block vector B1, or B0 is not available or B0 is not using IBC mode), not insert the block vector of B0 block into the IBC merge candidate list of the current block (B0 and B1 pruning).

If the A0 neighboring block is available and is using IBC mode, prune (or determine) whether the block vector of A0 is same as A1. If the block vector of A0 is not same as the block vector of A1, insert the block vector of A0 block into the IBC merge candidate list of the current block. Otherwise (block vector of A0 is same as the block vector A1, or A0 is not available or A0 is not using IBC mode), not insert the block vector of A0 block into the IBC merge candidate list of the current block (A0 and A1 pruning).

If the B2 neighboring block is available and is using IBC mode, and the current IBC merge list size is smaller than 4, prune (or determine) whether the block vector of B2 is same as A1 and whether the block vector of B2 is same as B1. If the block vector of B2 is not same as the block vector of A1 and the block vector of B2 is not same as B1, insert the block vector of B2 block into the IBC merge candidate list of the current block. Otherwise (block vector of B2 is same as the block vector A1 or B1, or B0 is not available or B0 is not using IBC mode), not insert the block vector of B0 block into the IBC merge candidate list of the current block (B2 and A1 pruning and B2 B1 pruning).

If the last HMVP candidate $H_k$ is available and is using IBC mode, and the current IBC merge candidate list size is smaller than a value, the value equal to the maximum IBC merge candidate number minus one, and the block vector of $H_k$ is not same as A1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of A1), not insert the block vector of $H_k$ into the IBC merge candidate list of the current block (pruning $H_k$ and A1).

If the second last HMVP candidate $H_{k-1}$ is available and is using IBC mode, and the current IBC merge candidate list size is smaller than a value, the value equal to the maximum IBC merge candidate number minus one, and the block vector of $H_{k-1}$ is not same as A1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one, or the block vector of $H_{k-1}$ is same as the block vector of A1), not insert the block vector of $H_{k-1}$ into the IBC merge candidate list of the current block(pruning $H_{k-1}$ and B1).

Insert the rest HMVP candidates one by one into the IBC merge candidate list, if the candidate is available and is using IBC mode and the current IBC merge candidate list size is smaller than the maximum IBC merge candidate number minus one (no pruning).

Insert the pairwise candidate into the IBC merge candidate list, if the current IBC merge candidate list size is smaller than maximum IBC merge candidate number (no pruning).

Solution 5

According to solution 5, the block vector pruning of spatial neighboring block is kept the same. For the HMVP candidate pruning, the block vector of the last HMVP candidate $H_k$ and the second last HMVP candidate $H_{k-1}$ is pruned with the block vector spatial neighboring block B1. The rest of the HMVP candidates are removed. In an embodiment, the following pruning may be performed during IBC merge list construction:

Pruning between A1 and B1
Pruning between A0 and A1
Pruning between B0 and B1
Pruning between B2 and A1
Pruning between B2 and B1
Pruning between the last HMVP candidate $H_k$ and B1
Pruning between the second last HMVP candidate $H_{k-1}$ and B1

In this case, the maximum number of pruning for construct IBC merge candidate list of current block is reduced from 9 to 7. This solution significant reduced the IBC merge list construction complexity for both encoder and decoder.

In an example, an IBC merge candidate list is constructed as follow:

If the A1 neighboring block is available and is using IBC mode, insert the block vector of A1 block into the IBC merge candidate list of the current block. Otherwise (A1 is not available or A1 is not using IBC mode), not insert the block vector of A1 block into the IBC merge candidate list of the current block (first candidate, no pruning).

If the B1 neighboring block is available and is using IBC mode, prune (or determine) whether the block vector of B1 is same as A1. If the block vector of B1 is not same as the block vector of A1, insert the block vector of B1 block into the IBC merge candidate list of the current block. Otherwise (block vector of B1 is same as the block vector A1, or B1 is not available or B1 is not using IBC mode), not insert the block vector of A1 block into the IBC merge candidate list of the current block (A1 and B1 pruning).

If the B0 neighboring block is available and is using IBC mode, prune (or determine) whether the block vector of B0 is same as B1. If the block vector of B0 is not same as the block vector of B1, insert the block vector of B0 block into the IBC merge candidate list of the current block. Otherwise (block vector of B0 is same as the block vector B1, or B0 is not available or B0 is not using IBC mode), not insert the block vector of B0 block into the IBC merge candidate list of the current block (B0 and B1 pruning).

If the A0 neighboring block is available and is using IBC mode, prune (or determine) whether the block vector of A0 is same as A1. If the block vector of A0 is not same as the block vector of A1, insert the block vector of A0 block into the IBC merge candidate list of the current block. Otherwise (block vector of A0 is same as the block vector A1, or A0 is not available or A0 is not using IBC mode), not insert the block vector of A0 block into the IBC merge candidate list of the current block (A0 and A1 pruning).

If the B2 neighboring block is available and is using IBC mode and the current IBC merge list size is smaller than 4, prune (or determine) whether the block vector of B2 is same as A1 and whether the block vector of B2 is same as B1. If the block vector of B2 is not same as the block vector of A1 and the block vector of B2 is not same as B1, insert the block vector of B2 block into the IBC merge candidate list of the current block. Otherwise (block vector of B2 is same as the block vector A1 or B1, or B0 is not available or B0 is not using IBC mode), not insert the block vector of B0 block into the IBC merge candidate list of the current block (B2 and A1 pruning and B2 B1 pruning).

If the last HMVP candidate $H_k$ is available and is using IBC mode and the current IBC merge candidate list size is smaller than a value, the value equal to the maximum IBC merge candidate number minus one, and the block vector of $H_k$ is not same as B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of B1), not insert the block vector of $H_k$ into the IBC merge candidate list of the current block (pruning $H_k$ and B1).

If the second last HMVP candidate $H_{k-1}$ is available and is using IBC mode, and the current IBC merge candidate list size is smaller than a value, the value equal to the maximum IBC merge candidate number minus one, and the block vector of $H_{k-1}$ is not same as B1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one, or the block vector of $H_{k-1}$ is same as the block vector of B1), not insert the block vector of $H_{k-1}$ into the IBC merge candidate list of the current block (pruning $H_{k-1}$ and B1).

Insert the rest HMVP candidates one by one into the IBC merge candidate list, if the candidate is available and is using IBC mode and the current IBC merge candidate list size is smaller than the maximum IBC merge candidate number minus one (no pruning).

Insert the pairwise candidate into the IBC merge candidate list, if the current IBC merge candidate list size is smaller than maximum IBC merge candidate number (no pruning).

Solution 6

According to solution 6, in this solution the last candidate of the IBC merge candidate list is allowed using HMVP mode, the pruning process of IBC merge list construction in this solution is not changed, but this method embodiment introduces a more efficient merge list construction method.

In an example, the concrete IBC merge candidate list is constructed as follow:

If the A1 neighboring block is available and is using IBC mode, insert the block vector of A1 block into the IBC merge candidate list of the current block. Otherwise (A1 is not available or A1 is not using IBC mode), not insert the block vector of A1 block into the IBC merge candidate list of the current block (first candidate, no pruning).

If the B1 neighboring block is available and is using IBC mode, prune (or determine) whether the block vector of B1 is same as A1. If the block vector of B1 is not same as the block vector of A1, insert the block vector of B1 block into the IBC merge candidate list of the current block. Otherwise (block vector of B1 is same as the block vector A1, or B1 is not available or B1 is not using IBC mode), not insert the block vector of A1 block into the IBC merge candidate list of the current block (A1 and B1 pruning).

If the B0 neighboring block is available and is using IBC mode, prune (or determine) whether the block vector of B0 is same as B1. If the block vector of B0 is not same as the block vector of B1, insert the block vector of B0 block into the IBC merge candidate list of the current block. Otherwise (block vector of B0 is same as the block vector B1, or B0 is not available or B0 is not using IBC mode), not insert the block vector of B0 block into the IBC merge candidate list of the current block (B0 and B1 pruning).

If the A0 neighboring block is available and is using IBC mode, prune (or determine) whether the block vector of A0 is same as A1. If the block vector of A0 is not same as the block vector of A1, insert the block vector of A0 block into the IBC merge candidate list of the current block. Otherwise (block vector of A0 is same as the block vector A1, or A0 is not available or A0 is not using IBC mode), not insert the block vector of A0 block into the IBC merge candidate list of the current block (A0 and A1 pruning).

If the B2 neighboring block is available and is using IBC mode, and the current IBC merge list size is smaller than 4, prune (or determine) whether the block vector of B2 is same as A1 and whether the block vector of B2 is same as B1. If the block vector of B2 is not same as the block vector of A1 and the block vector of B2 is not same as B1, insert the block vector of B2 block into the IBC merge candidate list of the current block. Otherwise (block vector of B2 is same as the block vector A1 or B1, or B0 is not available or B0 is not using IBC mode), not insert the block vector of B0 block into the IBC merge candidate list of the current block (B2 and A1 pruning, B2 and B1 pruning).

If the last HMVP candidate $H_k$ is available and is using IBC mode, and the current IBC merge candidate list size is smaller than the maximum IBC merge candidate number, and the block vector of $H_k$ is not same as A1 and B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number, or the block vector of $H_k$ is same as the block vector of A1, or the block vector of $H_k$ is same as the block vector of B1), not insert the block vector of $H_k$ into the IBC merge candidate list of the current block (pruning $H_k$ and A1, $H_k$ and B1).

If the second last HMVP candidate $H_{k-1}$ is available and is using IBC mode, and the current IBC merge candidate list size is smaller than the maximum IBC merge candidate number and the block vector of $H_{k-1}$ is not same as A1 and B1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number or the block vector of $H_{k-1}$ is same as the block vector of A1, or the block vector of $H_{k-1}$ is same as the block vector of B1), not insert the block vector of $H_{k-1}$ into the IBC merge candidate list of the current block (pruning $H_{k-1}$ and A1, $H_{k-1}$ and B1).

Insert the rest HMVP candidates one by one into the IBC merge candidate list, if the candidate is available and is using IBC mode, and the current IBC merge candidate list size is smaller than the maximum IBC merge candidate number (no pruning).

Insert the pairwise candidate into the IBC merge candidate list, if the current IBC merge candidate list size is smaller than maximum IBC merge candidate number (no pruning).

Solution 7

According to solution 7, the block vector pruning of spatial neighboring block is kept the same. For the HMVP candidate pruning, the block vector of the last HMVP candidate $H_k$ and the second last HMVP candidate $H_{k-1}$ is pruned with the block vector of the first spatial neighboring block of A1 and B1. If none of A1 or B1 is already inside the IBC merge list, then no HMVP candidate is proved with spatial candidate.

The rest of the HMVP candidates are removed. In an embodiment, the following pruning is possible worst case pruning process during IBC merge list construction:

Pruning between A1 and B1
Pruning between A0 and A1
Pruning between B0 and B1
Pruning between B2 and A1

Pruning between B2 and B1

Pruning between the last HMVP candidate $H_k$ and A1 or $H_k$ and B1

Pruning between the second last HMVP candidate $H_{k-1}$ and A1 or $H_{k-1}$ and B1

In this case, the maximum number of pruning for construct IBC merge candidate list of current block is reduced from 9 to 7. This solution significant reduced the IBC merge list construction complexity for both encoder and decoder.

In an example, an IBC merge candidate list is constructed as follow:

If the A1 neighboring block is available and is using IBC mode, insert the block vector of A1 block into the IBC merge candidate list of the current block. Otherwise (A1 is not available or A1 is not using IBC mode), not insert the block vector of A1 block into the IBC merge candidate list of the current block (first candidate, no pruning).

If the B1 neighboring block is available and is using IBC mode, prune (or determine) whether the block vector of B1 is same as A1. If the block vector of B1 is not same as the block vector of A1, insert the block vector of B1 block into the IBC merge candidate list of the current block. Otherwise (block vector of B1 is same as the block vector A1, or B1 is not available or B1 is not using IBC mode), not insert the block vector of A1 block into the IBC merge candidate list of the current block (A1 and B1 pruning).

If the B0 neighboring block is available and is using IBC mode, prune (or determine) whether the block vector of B0 is same as B1. If the block vector of B0 is not same as the block vector of B1, insert the block vector of B0 block into the IBC merge candidate list of the current block. Otherwise (block vector of B0 is same as the block vector B1, or B0 is not available or B0 is not using IBC mode), not insert the block vector of B0 block into the IBC merge candidate list of the current block (B0 and B1 pruning).

If the A0 neighboring block is available and is using IBC mode, prune (or determine) whether the block vector of A0 is same as A1. If the block vector of A0 is not same as the block vector of A1, insert the block vector of A0 block into the IBC merge candidate list of the current block. Otherwise (block vector of A0 is same as the block vector A1, or A0 is not available or A0 is not using IBC mode), not insert the block vector of A0 block into the IBC merge candidate list of the current block (A0 and A1 pruning).

If the B2 neighboring block is available and is using IBC mode and the current IBC merge list size is smaller than 4, prune (or determine) whether the block vector of B2 is same as A1 and whether the block vector of B2 is same as B1. If the block vector of B2 is not same as the block vector of A1 and the block vector of B2 is not same as B1, insert the block vector of B2 block into the IBC merge candidate list of the current block. Otherwise (block vector of B2 is same as the block vector A1 or B1, or B0 is not available or B0 is not using IBC mode), not insert the block vector of B0 block into the IBC merge candidate list of the current block (B2 and A1 pruning and B2 B1 pruning).

If A1 is already in the IBC merge list, then:

If the last HMVP candidate $H_k$ is available and is using IBC mode and the current IBC merge candidate list size is smaller than a value, the value equal to the maximum IBC merge candidate number minus one, and the block vector of $H_k$ is not same as A1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of A1), not insert the block vector of $H_k$ into the IBC merge candidate list of the current block (pruning $H_k$ and A1).

If the second last HMVP candidate $H_{k-1}$ is available and is using IBC mode, and the current IBC merge candidate list size is smaller than a value, the value equal to the maximum IBC merge candidate number minus one, and the block vector of $H_{k-1}$ is not same as A1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one, or the block vector of $H_{k-1}$ is same as the block vector of A1), not insert the block vector of $H_{k-1}$ into the IBC merge candidate list of the current block (pruning $H_{k-1}$ and A1).

Otherwise if A1 is not in the IBC merge list and B1 is already in the IBC merge list, then:

If the last HMVP candidate $H_k$ is available and is using IBC mode and the current IBC merge candidate list size is smaller than a value, the value equal to the maximum IBC merge candidate number minus one, and the block vector of $H_k$ is not same as B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of B1), not insert the block vector of $H_k$ into the IBC merge candidate list of the current block (pruning $H_k$ and B1).

If the second last HMVP candidate $H_{k-1}$ is available and is using IBC mode, and the current IBC merge candidate list size is smaller than a value, the value equal to the maximum IBC merge candidate number minus one, and the block vector of $H_{k-1}$ is not same as B1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one, or the block vector of $H_{k-1}$ is same as the block vector of B1), not insert the block vector of $H_{k-1}$ into the IBC merge candidate list of the current block (pruning $H_{k-1}$ and B1).

Otherwise if none of A1 and B1 is already in the IBC merge list then:

If the last HMVP candidate $H_k$ is available and is using IBC mode and the current IBC merge candidate list size is smaller than a value, the value equal to the maximum IBC merge candidate number minus one, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one), not insert the block vector of $H_k$ into the IBC merge candidate list of the current block (no pruning).

If the second last HMVP candidate $H_{k-1}$ is available and is using IBC mode, and the current IBC merge candidate list size is smaller than a value, the value equal to the maximum IBC merge candidate number minus one, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one), not insert the block vector of $H_{k-1}$ into the IBC merge candidate list of the current block (no pruning).

Insert the rest HMVP candidates one by one into the IBC merge candidate list, if the candidate is available and is using IBC mode and the current IBC merge candidate list size is smaller than the maximum IBC merge candidate number minus one (no pruning).

Insert the pairwise candidate into the IBC merge candidate list, if the current IBC merge candidate list size is smaller than maximum IBC merge candidate number (no pruning).

Solution 8

According to solution 8, in an embodiment, the block vector pruning of spatial neighboring block is kept the same. For the HMVP candidate pruning, the block vector of the last HMVP candidate $H_k$ and the second last HMVP candidate $H_{k-1}$ are pruned with the block vector of the spatial neighboring block of A1, when A1 is already in the IBC merge list, and B1 is not in the IBC Merge list;
the block vector of the last HMVP candidate $H_k$ and the second last HMVP candidate $H_{k-1}$ are pruned with the block vector of the spatial neighboring block of B1, when B1 is already in the IBC merge list, and A1 is not in the IBC Merge list;
the block vector of the last HMVP candidate $H_k$ is pruned with the block vector of the spatial neighboring block of B1, when both A1 and B1 are already in the IBC Merge list;
if none of A1 or B1 is already inside the IBC merge list, then no HMVP candidate is pruned with spatial candidate.

In this case, the maximum number of pruning for construct IBC merge candidate list of current block is reduced from 9 to 7. This solution significant reduced the IBC merge list construction complexity for both encoder and decoder.

In an example, an IBC merge candidate list is constructed as follow:

If the A1 neighboring block is available and is using IBC mode, insert the block vector of A1 block into the IBC merge candidate list of the current block. Otherwise (A1 is not available or A1 is not using IBC mode), not insert the block vector of A1 block into the IBC merge candidate list of the current block (first candidate, no pruning).

If the B1 neighboring block is available and is using IBC mode, prune (or determine) whether the block vector of B1 is same as A1. If the block vector of B1 is not same as the block vector of A1, insert the block vector of B1 block into the IBC merge candidate list of the current block. Otherwise (block vector of B1 is same as the block vector A1, or B1 is not available or B1 is not using IBC mode), not insert the block vector of A1 block into the IBC merge candidate list of the current block (A1 and B1 pruning).

If the B0 neighboring block is available and is using IBC mode, prune (or determine) whether the block vector of B0 is same as B1. If the block vector of B0 is not same as the block vector of B1, insert the block vector of B0 block into the IBC merge candidate list of the current block. Otherwise (block vector of B0 is same as the block vector B1, or B0 is not available or B0 is not using IBC mode), not insert the block vector of B0 block into the IBC merge candidate list of the current block (B0 and B1 pruning).

If the A0 neighboring block is available and is using IBC mode, prune (or determine) whether the block vector of A0 is same as A1. If the block vector of A0 is not same as the block vector of A1, insert the block vector of A0 block into the IBC merge candidate list of the current block. Otherwise (block vector of A0 is same as the block vector A1, or A0 is not available or A0 is not using IBC mode), not insert the block vector of A0 block into the IBC merge candidate list of the current block (A0 and A1 pruning).

If the B2 neighboring block is available and is using IBC mode and the current IBC merge list size is smaller than 4, prune (or determine) whether the block vector of B2 is same as A1 and whether the block vector of B2 is same as B1. If the block vector of B2 is not same as the block vector of A1 and the block vector of B2 is not same as B1, insert the block vector of B2 block into the IBC merge candidate list of the current block. Otherwise (block vector of B2 is same as the block vector A1 or B1, or B0 is not available or B0 is not using IBC mode), not insert the block vector of B0 block into the IBC merge candidate list of the current block (B2 and A1 pruning and B2 B1 pruning).

If A1 is already in the IBC merge list and B1 is no in the list, then:

If the last HMVP candidate $H_k$ is available and is using IBC mode and the current IBC merge candidate list size is smaller than a value, the value equal to the maximum IBC merge candidate number minus one, and the block vector of $H_k$ is not same as A1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of A1), not insert the block vector of $H_k$ into the IBC merge candidate list of the current block (pruning $H_k$ and A1).

If the second last HMVP candidate $H_{k-1}$ is available and is using IBC mode, and the current IBC merge candidate list size is smaller than a value, the value equal to the maximum IBC merge candidate number minus one, and the block vector of $H_{k-1}$ is not same as A1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one, or the block vector of $H_{k-1}$ is same as the block vector of A1), not insert the block vector of $H_{k-1}$ into the IBC merge candidate list of the current block (pruning $H_{k-1}$ and A1).

Otherwise if A1 is not in the IBC merge list and B1 is already in the IBC merge list, then:

If the last HMVP candidate $H_k$ is available and is using IBC mode and the current IBC merge candidate list size is smaller than a value, the value equal to the maximum IBC merge candidate number minus one, and the block vector of $H_k$ is not same as B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of B1), not insert the block vector of $H_k$ into the IBC merge candidate list of the current block (pruning $H_k$ and B1).

If the second last HMVP candidate $H_{k-1}$ is available and is using IBC mode, and the current IBC merge candidate list size is smaller than a value, the value equal to the maximum IBC merge candidate number minus one, and the block vector of $H_{k-1}$ is not same as B1, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one, or the block vector of $H_{k-1}$ is same as the block vector of B1), not insert the block vector of $H_{k-1}$ into the IBC merge candidate list of the current block (pruning $H_{k-1}$ and B1).

Otherwise if both A1 and B1 already in the IBC merge list, then:

If the last HMVP candidate $H_k$ is available and is using IBC mode and the current IBC merge candidate list size is smaller than a value, the value equal to the maximum IBC merge candidate number minus one, and the block vector of $H_k$ is not same as A1 and the block vector of $H_k$ is not same as B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of A1 or the block vector of $H_k$ is same as the block vector of B1), not insert the block vector of $H_k$ into the IBC merge candidate list of the current block (pruning $H_k$ and A1 and B1).

Otherwise if none of A1 and B1 is ready in the IBC merge list then,

If the last HMVP candidate $H_k$ is available and is using IBC mode and the current IBC merge candidate list size is smaller than a value, the value equal to the maximum IBC merge candidate number minus one, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one), not insert the block vector of $H_k$ into the IBC merge candidate list of the current block (no pruning).

If the second last HMVP candidate $H_{k-1}$ is available and is using IBC mode, and the current IBC merge candidate list size is smaller than a value, the value equal to the maximum IBC merge candidate number minus one, insert the block vector of $H_{k-1}$ into the IBC merge candidate list of the current block. Otherwise ($H_{k-1}$ is not available or $H_{k-1}$ is not using IBC mode or current IBC merge candidate list size is not smaller than the maximum IBC merge candidate number minus one), not insert the block vector of $H_{k-1}$ into the IBC merge candidate list of the current block (no pruning).

Insert the rest HMVP candidates one by one into the IBC merge candidate list, if the candidate is available and is using IBC mode and the current IBC merge candidate list size is smaller than the maximum IBC merge candidate number minus one (no pruning).

Insert the pairwise candidate into the IBC merge candidate list, if the current IBC merge candidate list size is smaller than maximum IBC merge candidate number (no pruning).

Solution 9

According to solution 9, in one embodiment, on top of solution 1 the spatial neighbor B0 based on the availability of B0 and B1; the spatial neighbor A0 based on the availability of A0 and A1; the spatial neighbor B2 based on the availability of B2, B1 and A1, For Example:

If the B0 neighboring block is available and is using IBC mode and B1 is not available, the block vector of B0 block is inserted into the IBC merge candidate list of the current block Otherwise (B0 is not available or B0 is not using IBC mode or B1 is available), the block vector of B0 block is not inserted into the IBC merge candidate list of the current block (no pruning).

If the A0 neighboring block is available and is using IBC mode and A1 is not available, the block vector of A0 block is inserted into the IBC merge candidate list of the current block. Otherwise (A0 is not available or A0 is not using IBC mode or A1 is available), the block vector of A0 block is not inserted into the IBC merge candidate list of the current block (no pruning).

If the B2 neighboring block is available and is using IBC mode both A1 and B1 are not available, and current IBC merge candidate list size is smaller than 4, the block vector of B2 block is inserted into the IBC merge candidate list of the current block. Otherwise (B2 is not available or B2 is not using IBC mode or current IBC merge candidate list size is not smaller than 4 or A1 is available or B1 is available), the block vector of B2 block is not inserted into the IBC merge candidate list of the current block (no pruning).

In this solution, no further additional pruning is added, but more coding efficiency is achieved compared with solution 1.

Solution 10

According to solution 10, in some embodiments, any of solution 1 to 9 can be combined together to reduce the IBC merge list construction complexity.

In an example for solution 10, solution 2 and solution 3 are combined. As the left (A1) and above (B1) spatial neighboring blocks are important for predicting the current block by using IBC mode. In this example, the spatial neighboring block pruning between A1 and B1 is kept, block vectors of the rest of the spatial neighboring blocks are not inserted into the IBC merge list. For the HMVP candidate pruning, the block vector of the last HMVP candidate $H_k$ is pruned with the block vector spatial neighboring block A1 and B1. In an embodiment, the following pruning may be performed during IBC merge list construction:

Pruning between A1 and B1

Pruning between the last HMVP candidate $H_k$ and A1

Pruning between the last HMVP candidate $H_k$ and B1.

In this case, the maximum number of pruning for construct IBC merge candidate list of current block is reduced from 9 to 3. The solution significant reduced the IBC merge list construction complexity for both encoder and decoder.

In an example, the last candidate of the IBC merge candidate list can use an HMVP mode.

In an example, an IBC merge candidate list is constructed as follow:

If the A1 neighboring block is available and is using IBC mode, the block vector of A1 block is inserted into the IBC merge candidate list of the current block. Otherwise (A1 is not available or A1 is not using IBC mode), the block vector of A1 block is not inserted into the IBC merge candidate list of the current block (first candidate, no pruning).

If the B1 neighboring block is available and is using IBC mode and the block vector of A1 block is inserted into the IBC merge candidate list of the current block, prune (or determine) whether the block vector of B1 is same as A1. If the block vector of B1 is not same as the block vector of A1, the block vector of B1 block is inserted into the IBC merge candidate list of the current block. Otherwise (block vector of B1 is same as the block vector A1, or B1 is not available or B1 is not using IBC mode), the block vector of B1 block is not inserted into the IBC merge candidate list of the current block (A1 and B1 pruning).

If the last HMVP candidate $H_k$ is available and is using IBC mode, and the current IBC merge candidate list size is smaller than a value, the value equal to the maximum IBC merge candidate number minus one; and the block vector of $H_k$ is not same as A1 and B1, insert the block vector of $H_k$ into the IBC merge candidate list of the current block. Otherwise ($H_k$ is not available or $H_k$ is not using IBC mode or current IBC merge candidate list size is not smaller than the maximum IBC merge candidate number minus one, or the block vector of $H_k$ is same as the block vector of A1, or the block vector of $H_k$ is same as the block vector of B1) not insert the block vector of $H_k$ into the IBC merge candidate list of the current block (pruning $H_k$ and A1, $H_k$ and B1).

Insert the rest HMVP candidates one by one into the IBC merge candidate list, if the candidate is available and is using IBC mode, and the current IBC merge candidate list size is smaller than the maximum IBC merge candidate number minus one (no pruning).

In some examples, further insert the pairwise candidate into the IBC merge candidate list, if the current IBC merge candidate list size is smaller than maximum IBC merge candidate number (no pruning).

In an example, for decoding process for coding units coded in IBC prediction mode.

8.6.1 General decoding process for coding units coded in IBC prediction mode

Inputs to this Process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single or a dual tree is used and if a dual tree is used,
it specifies whether the current tree corresponds to the luma or chroma components.

Output of this process is a modified reconstructed picture before in-loop filtering.

The derivation process for quantization parameters is invoked with the luma location (xCb, yCb), the width of the current coding block in luma samples cbWidth and the height of the current coding block in luma samples cbHeight, and the variable treeType as inputs.

The variable IsGt4by4 is derived as follows:

$$IsGt4by4=(cbWidth*cbHeight)>16 \quad (1111).$$

The decoding process for coding units coded in IBC prediction mode can include the following operations:

1. The block vector components of the current coding unit are derived as follows:

The derivation process for block vector components is invoked with the luma coding block location (xCb, yCb), the luma coding block width cbWidth and the luma coding block height cbHeight as inputs, and the luma block vector bvL as output.
When treeType is equal to SINGLE_TREE, the derivation process for chroma block is invoked with luma block vector bvL as input, and chroma block vector bvC as output.

2. The prediction samples of the current coding unit are derived as follows:

The decoding process for IBC blocks as specified in clause 8.6.3.1 is invoked with the luma coding block location (xCb, yCb), the luma coding block width cbWidth and the luma coding block height cbHeight, the luma block vector bvL, the variable cIdx set equal to 0 as inputs, and the IBC prediction samples (predSamples) that are an (cbWidth)×(cbHeight) array predSamplesL of prediction luma samples as outputs.

When treeType is equal to SINGLE_TREE, the prediction samples of the current coding unit are derived as follows:

The decoding process for IBC blocks as specified in clause 8.6.3.1 is invoked with the luma coding block location (xCb, yCb), the luma coding block width cbWidth and the luma coding block height cbHeight, the chroma block vector bvC and the variable cIdx set equal to 1 as inputs, and the IBC prediction samples (predSamples) that are an (cbWidth/SubWidthC)×(cbHeight/SubHeightC) array predSamplesCb of prediction chroma samples for the chroma components Cb as outputs.

The decoding process for IBC blocks as specified in clause 8.6.3.1 is invoked with the luma coding block location (xCb, yCb), the luma coding block width cbWidth and the luma coding block height cbHeight, the chroma block vector bvC and the variable cIdx set equal to 2 as inputs, and the IBC prediction samples (predSamples) that are an (cbWidth/SubWidthC)×(cbHeight/SubHeightC) array predSamplesCr of prediction chroma samples for the chroma components Cr as outputs.

3. The residual samples of the current coding unit are derived as follows:

The decoding process for the residual signal of coding blocks coded in inter prediction mode is invoked with the location (xTb0, yTb0) set equal to the luma location (xCb, yCb), the width nTbW set equal to the luma coding block width cbWidth, the height nTbH set equal to the luma coding block height cbHeight and the variable cIdx set equal to 0 as inputs, and the array resSamplesL as output.

When treeType is equal to SINGLE_TREE, the decoding process for the residual signal of coding blocks coded in inter prediction mode is invoked with the location (xTb0, yTb0) set equal to the chroma location (xCb/SubWidthC, yCb/SubHeightC), the width nTbW set equal to the chroma coding block width cbWidth/SubWidthC, the height nTbH set equal to the chroma coding block height cbHeight/SubHeightC and the variable cIdx set equal to 1 as inputs, and the array resSamplesCb as output.

When treeType is equal to SINGLE_TREE, the decoding process for the residual signal of coding blocks coded in inter prediction mode is invoked with the location (xTb0, yTb0) set equal to the chroma location (xCb/SubWidthC, yCb/SubHeightC), the width nTbW set equal to the chroma coding block width cbWidth/SubWidthC, the height nTbH set equal to the chroma coding block height cbHeight/SubHeightC and the variable cIdxset equal to 2 as inputs, and the array resSamplesCr as output.

4. The reconstructed samples of the current coding unit are derived as follows:

The picture reconstruction process for a colour component is invoked with the block location (xCurr, yCurr) set equal to (xCb, yCb), the block width nCurrSw set equal to cbWidth, the block height nCurrSh set equal to cbHeight, the variable cIdx set equal to 0, the (cbWidth)×(cbHeight) array predSamples set equal to predSamplesL and the (cbWidth)×(cbHeight) array resSamples set equal to resSamplesL as inputs, and the output is a modified reconstructed picture before in-loop filtering.

When treeType is equal to SINGLE_TREE, the picture reconstruction process for a colour component is invoked with the block location (xCurr, yCurr) set equal to (xCb/SubWidthC, yCb/SubHeightC), the block width nCurrSw set equal to cbWidth/SubWidthC, the block height nCurrSh set equal to cbHeight/SubHeightC, the variable cIdx set equal to 1, the (cbWidth/SubWidthC)×(cbHeight/SubHeightC) array predSamples set equal to predSamplesCb and the (cbWidth/SubWidthC)×(cbHeight/SubHeightC) array resSamples set equal to resSamplesCb as inputs, and the output is a modified reconstructed picture before in-loop filtering.

When treeType is equal to SINGLE_TREE, the picture reconstruction process for a colour component is invoked with the block location (xCurr, yCurr) set equal to (xCb/SubWidthC, yCb/SubHeightC), the block width nCurrSw set equal to cbWidth/SubWidthC, the block height nCurrSh set equal to cbHeight/SubHeightC, the variable cIdx set equal to 2, the (cbWidth/SubWidthC)×(cbHeight/Sub- HeightC) array predSamples set equal to predSamplesCr and the (cbWidth/SubWidthC)×(cbHeight/SubHeightC) array resSamples set equal to resSamplesCr as inputs, and the output is a modified reconstructed picture before in-loop filtering.

8.6.2 Derivation process for block vector components for IBC blocks 8.6.2.1 General Inputs to this Process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this Process are:

the luma block vector in 1/16 fractional-sample accuracy bvL.

The luma block vector mvL is derived as follows:

The derivation process for IBC luma block vector prediction as specified in clause 8.6.2.2 is invoked with the luma location (xCb, yCb), the variables cbWidth and cbHeight inputs, and the output being the luma block vector bvL.

When general_merge_flag[xCb][yCb] is equal to 0, the following applies:

1. The variable bvd is derived as follows:

$$bvd[0]=MvdL0[xCb][yCb][0] \quad (1112)$$

$$bvd[1]=MvdL0[xCb][yCb][1] \quad (1113)$$

2. The rounding process for motion vectors is invoked with mvX set equal to bvL, rightShift set equal to AmvrShift, and leftShift set equal to AmvrShift as inputs and the rounded bvL as output.

3. The luma block vector bvL is modified as follows:

$$u[0]=(bvL[0]+bvd[0]+2^{18})\%2^{18} \quad (1114)$$

$$bvL[0]=(u[0]>=2^{17})?(u[0]-2^{18}):u[0] \quad (1115)$$

$$u[1]=(bvL[1]+bvd[1]+2^{18})\%2^{18} \quad (1116)$$

$$bvL[1]=(u[1]>=2^{17})?(u[1]-2^{18}):u[1] \quad (1117)$$

NOTE 1— The resulting values of bvL[0] and bvL[1] as specified above will always be in the range of $-2^{17}$ to $2^{17}-1$, inclusive.

When IsGt4by4 is equal to TRUE, the updating process for the history-based block vector predictor list as specified in clause 8.6.2.6 is invoked with luma block vector bvL. It is a requirement of bitstream conformance that the luma block vector bvL shall obey the following constraints:

CtbSizeY is greater than or equal to ((yCb+(bvL[1]>>4)) & (CtbSizeY−1))+cbHeight.

IbcVirBuf[0][(x+(bvL[0]>>4)) & (IbcBufWidthY−1)] [(y+(bvL[1]>>4)) & (C tbSizeY−1)] shall not be equal to −1 for x=xCb . . . xCb+cbWidth−1 and y=yCb . . . yCb+cbHeight−1.

8.6.2.2 Derivation process for IBC luma block vector prediction

This process is only invoked when CuPredMode[0][xCb][yCb] is equal to MODE_IBC, where (xCb, yCb) specify the top-left sample of the current luma coding block relative to the top-left luma sample of the current picture.

Inputs to this Process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this Process are:

the luma block vector in 1/16 fractional-sample accuracy bvL.

The luma block vector bvL can be derived by the following operations:

1. When IsGt4by4 is equal to TRUE, the derivation process for spatial block vector candidates from neighbouring coding units as specified in clause 8.6.2.3 is invoked with the luma coding block location (xCb, yCb), the luma coding block width cbWidth and height cbHeight as inputs, and the outputs being the availability flags availableFlagA1, availableFlagB1 and the block vectors bvA1 and bvB1.

2. When IsGt4by4 is equal to TRUE, the block vector candidate list, bvCandList, is constructed as follows:

```
i = 0
if( availableFlagA1 )
    bvCandList [ i++ ] = bvA1                (1118)
if( availableFlagB1 )
    bvCandList [ i++ ] = bvB1
```

3. The variable numCurrCand is derived as follows: IsGt4by4 is equal to TRUE, numCurrCand is set equal to the number of merging candidates in the bvCandList. Otherwise (IsGt4by4 is equal to FALSE), numCurrCand is set equal to 0.

4. When numCurrCand is less than MaxNumIbcMergeCand and NumHmvpIbcCand is greater than 0, the derivation process of IBC history-based block vector candidates as specified in 8.6.2.4 is invoked with bvCandList, and numCurrCand as inputs, and modified bvCandList and numCurrCand as outputs.

5. When numCurrCand is less than MaxNumIbcMergeCand, the following applies until numCurrCand is equal to MaxNumIbcMergeCand:

bvCandList[numCurrCand][0] is set equal to 0.
bvCandList[numCurrCand][1] is set equal to 0. numCurrCand is increased by 1.

6. The variable bvIdx is derived as follows:

$$bvIdx=general\_merge\_flag[xCb][yCb]?merge\_idx[xCb][yCb]:mvp\_10\_flag[xCb][yCb] \quad (1119)$$

7. The following assignments are made:

$$bvL[0]=bvCandList[mvIdx][0] \quad (1120)$$

$$bvL[1]=bvCandList[mvIdx][1] \quad (1121)$$

8.6.2.3 Derivation Process for IBC Spatial Block Vector Candidates

Inputs to this Process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this Process are as Follows:

the availability flags availableFlagA1 and availableFlagB1 of the neighbouring coding units, the block vectors in 1/16 fractional-sample accuracy bvA1, and bvB1 of the neighbouring coding units, For the derivation of availableFlagA1 and mvA1 the following applies:

The luma location (xNbA1, yNbA1) inside the neighbouring luma coding block is set equal to (xCb−1, yCb+cbHeight−1).

The derivation process for neighbouring block availability is invoked with the current luma location (xCurr, yCurr) set equal to (xCb, yCb), the neighbouring luma location (xNbA1, yNbA1), checkPredModeY set equal to TRUE, and cIdx set equal to 0 as inputs, and the output is assigned to the block availability flag availableA1.

The variables availableFlagA1 and bvA1 are derived as follows:

If availableA1 is equal to FALSE, availableFlagA1 is set equal to 0 and both components of bvA1 are set equal to 0. Otherwise, availableFlagA1 is set equal to 1 and the following assignments are made:

$$bvA1 = MvL0[xNbA1][yNbA1] \quad (1122)$$

For the derivation of availableFlagB1 and bvB1 the following applies:

The luma location (xNbB1, yNbB1) inside the neighbouring luma coding block is set equal to (xCb+cbWidth−1, yCb−1).

The derivation process for neighbouring block availability is invoked with the current luma location (xCurr, yCurr) set equal to (xCb, yCb), the neighbouring luma location (xNbB1, yNbB1), checkPredModeY set equal to TRUE, and cIdx set equal to 0 as inputs, and the output is assigned to the block availability flag availableB1.

The variables availableFlagB1 and bvB1 are derived as follows: If one or more of the following conditions are true, availableFlagB1 is set equal to 0 and both components of bvB1 are set equal to 0:
availableB1 is equal to FALSE.
availableA1 is equal to TRUE and the luma locations (xNbA1, yNbA1) and (xNbB1, yNbB1) have the same block vectors.
Otherwise, availableFlagB1 is set equal to 1 and the following assignments are made:

$$bvB1 = MvL0[xNbB1][yNbB1] \quad (1123).$$

8.6.2.4 Derivation Process for IBC History-Based Block Vector Candidates

Inputs to this Process are:
a block vector candidate list bvCandList,
the number of available block vector candidates in the list numCurrCand.

Outputs to this Process are:
the modified block vector candidate list bvCandList,
the modified number of motion vector candidates in the list numCurrCand.

The variables isPrunedA1 and isPrunedB1 are set both equal to FALSE.

For each candidate in HmvpIbcCandList[hMvpIdx] with index hMvpIdx=1 . . . NumHmvpIbcCand, the following operations can be repeated until numCurrCand is equal to MaxNumIbcMergeCand:

1. The variable sameMotion is derived as follows:

If all of the following conditions are true for any block vector candidate N with N being A1 or B1, sameMotion and isPrunedN are both set equal to TRUE: IsGt4by4 is equal to TRUE.
hMvpIdx is equal to 1.
The candidate HmvpIbcCandList[NumHmvpIbcCand−hMvpIdx] is equal to the block vector candidate N.
isPrunedN is equal to FALSE.
Otherwise, sameMotion is set equal to FALSE.

2. When sameMotion is equal to FALSE, the candidate HmvpIbcCandList[NumHmvpIbcCand−hMvpIdx] is added to the block vector candidate list as follows:

$$bvCandList[numCurrCand++] = HmvpIbcCandList[NumHmvpIbcCand-hMvpIdx] \quad (1124)$$

8.6.2.5 Derivation Process for Chroma Block Vectors
Input to this Process is:
a luma block vector in 1/16 fractional-sample accuracy bvL.
Output of this process is a chroma block vector in 1/32 fractional-sample accuracy bvC.
A chroma block vector is derived from the corresponding luma block vector.

The chroma block vector bvC is derived as follows:

$$bvC[0] = ((bvL[0]) >> (3 + SubWidthC)) * 32 \quad (1125)$$

$$bvC[1] = ((bvL[1]) >> (3 + SubHeightC)) * 32 \quad (1126)$$

8.6.2.6 Updating Process for the History-Based Block Vector Predictor Candidate List Inputs to this Process are:
luma block vector bvL in 1/16 fractional-sample accuracy.

The candidate list HmvpIbcCandList can be modified by the following operations:

1. The variable identicalCandExist is set equal to FALSE and the variable removeIdx is set equal to 0.

2. When NumHmvpIbcCand is greater than 0, for each index hMvpIdx with hMvpIdx=0 . . . NumHmvpIbcCand−1, the following operations apply until identicalCandExist is equal to TRUE:
When bvL is equal to HmvpIbcCandList[hMvpIdx], identicalCandExist is set equal to TRUE and removeIdx is set equal to hMvpIdx.

3. The candidate list HmvpIbcCandList is updated as follows:
If identicalCandExist is equal to TRUE or NumHmvpIbcCand is equal to 5, the following applies:
For each index i with i=(removeIdx+1) . . . (NumHmvpIbcCand−1), HmvpIbcCandList[i−1] is set equal to HmvpIbcCandList[i]. HmvpIbcCandList[NumHmvpIbcCand−1] is set equal to bvL.

Otherwise (identicalCandExist is equal to FALSE and NumHmvpIbcCand is less than 5), the following applies:
HmvpIbcCandList[NumHmvpIbcCand++] is set equal to bvL.

8.6.3 Decoding Process for IBC Blocks
8.6.3.1 General
This process is invoked when decoding a coding unit coded in IBC prediction mode.

Inputs to this Process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples, the block vector by,
a variable cIdx specifying the colour component index of the current block.

Outputs of this Process are:
an array predSamples of prediction samples.

When cIdx is equal to 0, for x=xCb . . . xCb+cbWidth−1 and y=yCb . . . yCb+cbHeight−1, the following applies:

$$xVb = (x+(bv[0]>>4))\&(IbcBufWidthY-1) \quad (1127)$$

$$yVb = (y+(by[1]>>4))\&(CtbSizeY-1) \quad (1128)$$

$$predSamples[x][y] = ibcVirBuf[0][xVb][yVb] \quad (1129)$$

When cIdx is not equal to 0, for x=xCb/subWidthC . . . xCb/subWidthC+cbWidth/subWidthC−1 and y=yCb/subHeightC . . . yCb/subHeightC+cbHeight/subHeightC−1, the following applies:

$$xVb = (x+(by[0]>>5))\&(IbcBufWidthC-1) \quad (1130)$$

$$yVb = (y+(by[1]>>5))\&((CtbSizeY/subHeightC)-1) \quad (1131)$$

$$predSamples[x][y] = ibcVirBuf[cIdx][xVb][yVb] \quad (1132)$$

When cIdx is equal to 0, the following assignments are made for x=0 . . . cbWidth−1 and y=0 . . . cbHeight−1:

$$MvL0[xCb+x][yCb+y] = bv \quad (1133)$$

$$MvL1[xCb+x][yCb+y] = 0 \quad (1134)$$

$$RefIdxL0[xCb+x][yCb+y] = -1 \quad (1135)$$

$$RefIdxL1[xCb+x][yCb+y] = -1 \quad (1136)$$

$$PredFlagL0[xCb+x][yCb+y] = 0 \quad (1137)$$

$$PredFlagL1[xCb+x][yCb+y] = 0 \quad (1138)$$

$$BcwIdx[xCb+x][yCb+y] = 0 \quad (1139).$$

Following is an explanation of the applications of the encoding method as well as the decoding method as shown in the above-mentioned embodiments, and a system using them.

Figure 8:
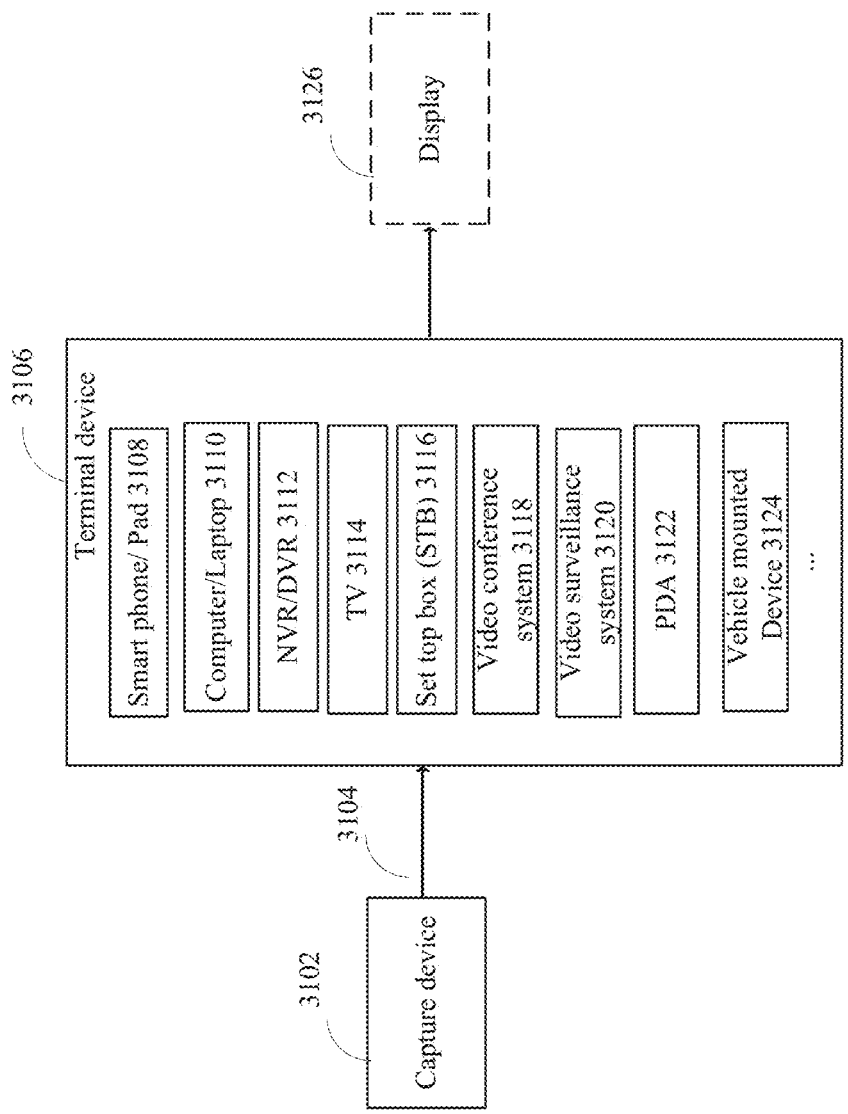
FIG. 8 is a block diagram showing an example structure of a content supply system 3100 which realizes a content delivery service according to one embodiment.

FIG. 8 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 9:
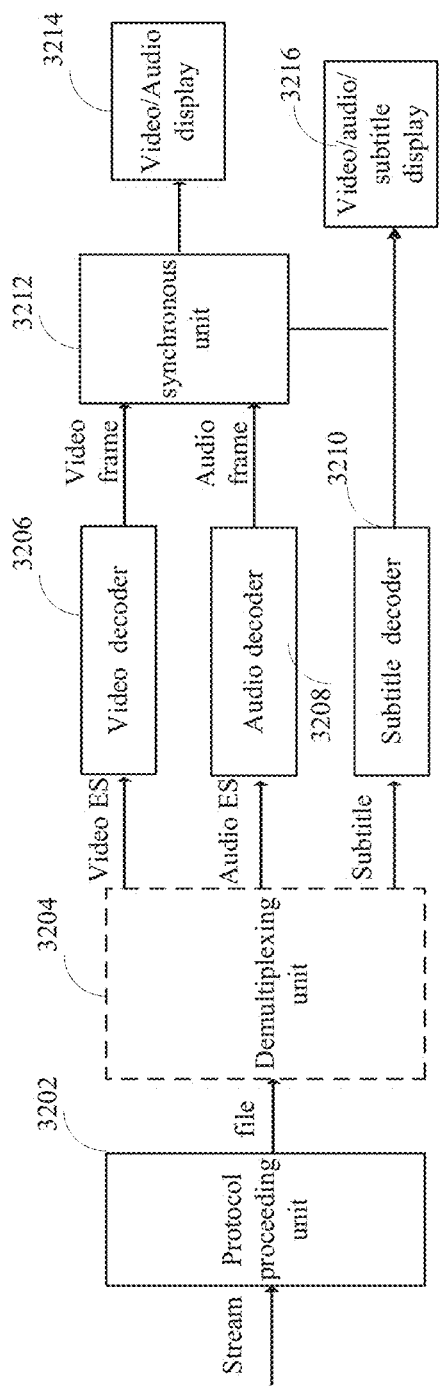
FIG. 9 is a block diagram showing a structure of an example of a terminal device according to one embodiment.

FIG. 9 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 9) before feeding it to the synchronous unit 3212. Similarly, the audio frame may store in a buffer (not shown in FIG. 9) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Example 1. A method to construct a candidate merge list for Intra block copy (IBC) mode, the method comprising: inserting a block vector of a left neighboring block of a current block into an initial merge list of the current block (in an example, the initial merge list is an empty list before this inserting operation), when the left neighboring block is available and the left neighboring block is using IBC mode; inserting a block vector of an above neighboring block of the current block into the initial merge list (in an example, the initial merge list is an empty list before this operation, or the initial merge list comprises a block vector of a left neighboring block of a current block), when the above neighboring block is available, the above neighboring block is using IBC mode and the block vector of the above neighboring block is not same as the block vector of the left neighboring block;

inserting a block vector of right-above neighboring block of the current block into the initial merge list (in an example, the initial merge list is an empty list before this operation, or the initial merge list comprises a block vector of an above neighboring block of a current block, or the initial merge list comprises a block vector of a left neighboring block of a current block, or the initial merge list comprises a block vector of an above neighboring block of a current block and a block vector of a left neighboring block of a current block), when the right-above neighboring block is available and the right-above neighboring block is using IBC mode.

Example 2. The method of example 1, wherein the method further comprises:
inserting a block vector of left-bottom neighboring block of the current block into the initial merge list (in an example, the initial merge list is an empty list before this operation, or the initial merge list comprises a block vector of an above neighboring block of a current block, or the initial merge list comprises a block vector of a left neighboring block of a current block, or the initial merge list comprises a block vector of an above neighboring block of a current block and a block vector of a left neighboring block of a current block, or the initial merge list comprises a block vector of an above neighboring block of a current block, a block vector of a left neighboring block of a current block and a block vector of a right-above neighboring block), when the left-bottom neighboring block is available and the left-bottom neighboring block is using IBC mode.

Example 3. The method of example 1 or 2, wherein the method further comprises:
inserting a block vector of left-above neighboring block of the current block into the initial merge list (in an example, the initial merge list is an empty list before this operation, or the initial merge list comprises a block vector of an above neighboring block of a current block, or the initial merge list comprises a block vector of a left neighboring block of a current block, or the initial merge list comprises a block vector of an above neighboring block of a current block and a block vector of a left neighboring block of a current block, or the initial merge list comprises a block vector of an above neighboring block of a current block, a block vector of a left neighboring block of a current block and a block vector of a right-above neighboring block, or the initial merge list comprises a block vector of an above neighboring block of a current block, a block vector of a left neighboring block of a current block, a block vector of a right-above neighboring block and a block vector of a left-bottom neighboring block), when the left-above neighboring block is available, the left-above neighboring block is using IBC mode and a number of block vectors in the initial merge list is smaller than a threshold (for example, the threshold is 4).

Example 4. An encoder (20) comprising processing circuitry for carrying out the method according to any one of examples 1 to 3.

Example 5. A decoder (30) comprising processing circuitry for carrying out the method according to any one of examples 1 to 3.

Example 6. A computer program product comprising a program code for performing the method according to any one of examples 1 to 3.

Example 7. A decoder or an encoder, comprising:
one or more processors; and
a non-transitory computer-readable storage medium coupled to the processors and storing programming for execution by the processors, wherein the programming, when executed by the processors, configures the decoder to carry out the method according to any one of examples 1 to 3.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-wise operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>> y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<< y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π+2 to π+2, inclusive, in units of radians Atan(x) the trigonometric inverse tangent function, operating on an argument x, with an output value in the range of −π+2 to π+2, inclusive, in units of radians $$\text{Atan2}(y,x) = \begin{cases} \text{Atan}\left(\frac{y}{x}\right); & x > 0 \\ \text{Atan}\left(\frac{y}{x}\right) + \pi; & x < 0\ \&\&\ y >= 0 \\ \text{Atan}\left(\frac{y}{x}\right) - \pi; & x < 0\ \&\&\ y < 0 \\ +\frac{\pi}{2}; & x == 0\ \&\&\ y >= 0 \\ -\frac{\pi}{2}; & \text{otherwise} \end{cases}$$

Ceil(x) the smallest integer greater than or equal to x.

$\text{Clip1}_Y(x) = \text{Clip3}(0,(1 << \text{BitDepth}_Y)-1,x)$ $\text{Clip1}_C(x) = \text{Clip3}(0,(1 << \text{BitDepth}_C)-1,x)$ $$\text{Clip3}(x,y,z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a,b,c,d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718281828 . . . ).

Log2(x) the base-2 logarithm of x.

Log10(x) the base-10 logarithm of x.

$$\text{Min}(x,y) = \begin{cases} x; & <= y \\ x; & > y \end{cases}$$

$$\text{Max}(x,y) = \begin{cases} x; & x >= y \\ y; & x < y \end{cases}$$

-continued $$\text{Round}(x) = \text{Sign}(x) * \text{Floor}(\text{Abs}(x)+0.5)$$

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians $$\text{Sqrt}(x) = \sqrt{x}$$

$$\text{Swap}(x,y) = (y,x)$$

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table) operations (with operands x, y, and z)

"x++", "x− −"

"!x", "−x" (as a unary prefix operator)

$x^y$

"x * y", "x / y", "x ÷ y", "$\frac{x}{y}$", "x % y"

"x + y", "x − y" (as a two-argument operator), "$\sum_{i=x}^{y} f(i)$"

"x << y", "x >> y"

"x < y", "x <= y", "x > y", "x >= y"

"x == y", "x != y"

"x & y"

"x | y"

"x && y"

"x | | y"

"x ? y : z"

"x..y"

"x = y", "x += y", "x −= y"

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:

. . . as follows / . . . the following applies:

If condition 0, statement 0

Otherwise, if condition 1, statement 1

Otherwise (informative remark on remaining condition), statement n

Each "If . . . Otherwise, if . . . Otherwise, . . ." statement in the text is introduced with " . . . as follows" or " . . . the following applies" immediately followed by "If . . . ". The last condition of the "If . . . Otherwise, if . . . Otherwise, . . ." is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a | | condition 1b )
    statement 1
...
else
    statement n
``` may be described in the following manner:

. . . as follows / . . . the following applies:

If all of the following conditions are true, statement 0:
    condition 0a
    condition 0b Otherwise, if one or more of the following conditions are true, statement 1:
    condition 1a
    condition 1b Otherwise, statement n In the text, a statement of logical operations as would be described mathematically in the following form:

```
if( condition 0 )
    statement 0
if( condition 1 )
    statement 1
``` may be described in the following manner:

When condition 0, statement 0

When condition 1, statement 1.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method for constructing a candidate merge list for Intra block copy (IBC) mode, the method comprising:
    inserting a block vector of a left neighboring block of a current block into an initial merge list of the current block, when the left neighboring block is available and the left neighboring block is using an IBC mode;
    inserting a block vector of an above neighboring block of the current block into the initial merge list, when the above neighboring block is available, the above neighboring block is using the IBC mode and the block vector of the above neighboring block is not identical to the block vector of the left neighboring block; and
    inserting a block vector of a last candidate in a history based motion vector predictor (HMVP) into the initial merge list subsequently after the block vector of the left neighboring block or the above neighboring block, when the block vector of the above neighboring block is not identical to the block vector of the last candidate in the HMVP and when the block vector of the left neighboring block is not identical to the block vector of the last candidate in the HMVP.

2. The method of claim 1, wherein the method further comprises:
    obtaining a block vector of the current block according to the initial merge list after the above inserting processes and a merge candidate index for the current block.

3. A method for constructing a candidate merge list for Intra block copy (IBC) mode, the method comprising:
    inserting a block vector of a neighboring block of a current block into an initial merge list of the current block, when the neighboring block is available and the neighboring block is using an IBC mode;
    inserting a block vector of a last candidate in a history based motion vector predictor (HMVP) into the initial merge list subsequently after the block vector of the neighboring block, when the block vector of the neighboring block is not identical to the block vector of the last candidate in the HMVP; and
    inserting a block vector of another candidate in the HMVP into the initial merge list, wherein pruning for the block vector of another candidate in the HMVP is removed.

4. The method of claim 3, wherein the method further comprises:
    obtaining a block vector of the current block according to the initial merge list after the above inserting processes and a merge candidate index for the current block.

5. A method for constructing a candidate merge list for Intra block copy (IBC) mode, the method comprising:
    inserting a block vector of a left neighboring block of a current block into an initial merge list of the current block, when the left neighboring block is available and the left neighboring block is using an IBC mode;
    inserting a block vector of an above neighboring block of the current block into the initial merge list, when the above neighboring block is available, the above neighboring block is using the IBC mode and the block vector of the above neighboring block is not identical to the block vector of the left neighboring block;
    inserting a block vector of a last candidate in a history based motion vector predictor (HMVP) into the initial merge list subsequently after the block vector of the left neighboring block or the above neighboring block, when the block vector of the above neighboring block is not identical to the block vector of the last candidate in the HMVP and when the block vector of the left neighboring block is not identical to the block vector of the last candidate in the HMVP; and inserting a block vector of another candidate in the HMVP into the initial merge list, wherein pruning for the block vector of another candidate in the HMVP is removed.

6. The method of claim 5, wherein the method further comprises:

obtaining a block vector of the current block according to the initial merge list after the above inserting processes and a merge candidate index for the current block.

7. The method of claim 5, wherein the initial merge list is an empty list before a first inserting process.

8. The method of claim 5, wherein the above inserting processes are performed orderly.

* * * * *